(12) United States Patent
Tanaka

(10) Patent No.: US 9,727,229 B2
(45) Date of Patent: Aug. 8, 2017

(54) STEREOSCOPIC DISPLAY DEVICE, METHOD FOR ACCEPTING INSTRUCTION, AND NON-TRANSITORY COMPUTER-READABLE MEDIUM FOR RECORDING PROGRAM

(71) Applicant: FUJIFILM Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 756 days.

(21) Appl. No.: 14/040,103

(22) Filed: Sep. 27, 2013

(65) Prior Publication Data

US 2014/0022198 A1 Jan. 23, 2014

Related U.S. Application Data

(63) Continuation of application No. PCT/JP2012/055176, filed on Mar. 1, 2012.

(30) Foreign Application Priority Data

Mar. 31, 2011 (JP) .................. 2011-079295

(51) Int. Cl.
*G09G 5/00* (2006.01)
*G06F 3/0488* (2013.01)
(Continued)

(52) U.S. Cl.
CPC .......... *G06F 3/0488* (2013.01); *G06F 3/0418* (2013.01); *G06F 3/0421* (2013.01);
(Continued)

(58) Field of Classification Search
CPC .......... G06F 3/0488; G09G 5/50; G09G 5/00
(Continued)

(56) References Cited

U.S. PATENT DOCUMENTS

2009/0237803 A1 9/2009 Hotta et al.
2010/0095206 A1 4/2010 Kim
(Continued)

FOREIGN PATENT DOCUMENTS

JP 6-131442 A 5/1994
JP 10-105735 A 4/1998
(Continued)

OTHER PUBLICATIONS

Chinese Office Action and English translation thereof, dated Jan. 12, 2016, for corresponding Chinese Application No. 201280017005.4.
(Continued)

*Primary Examiner* — Jennifer Nguyen
(74) *Attorney, Agent, or Firm* — Birch, Stewart, Kolasch & Birch, LLP

(57) ABSTRACT

A stereoscopic display device comprising: a stereoscopic display unit; a space sensor; a determination unit for determining whether the instruction position detected by the space sensor is within a detection area corresponding to the instruction stereoscopic image, and accepting an instruction corresponding to the instruction stereoscopic image; a disparity amount decision unit for deciding a disparity amount between the instruction left-eye image and the instruction right-eye image displayed by the stereoscopic display unit, and decreasing the disparity amount between the instruction left-eye image and the instruction right-eye image according to a decrease in the interval detected by the space sensor; and an image processing unit for displaying the instruction stereoscopic image on the stereoscopic display unit by the disparity amount decided by the disparity amount decision unit.

17 Claims, 16 Drawing Sheets

(51) Int. Cl.
 *G06F 3/041* (2006.01)
 *G06F 3/042* (2006.01)
 *H04N 13/00* (2006.01)
(52) U.S. Cl.
 CPC .......... *G06F 3/04886* (2013.01); *G06F 2203/04101* (2013.01); *H04N 13/0022* (2013.01)
(58) Field of Classification Search
 USPC .................. 345/629, 173, 204, 419
 See application file for complete search history.

(56) References Cited

U.S. PATENT DOCUMENTS

| | | | |
|---|---|---|---|
| 2010/0164910 A1* | 7/2010 | Tomisawa | G02B 27/0093 345/204 |
| 2010/0315413 A1 | 12/2010 | Izadi et al. | |
| 2010/0315417 A1 | 12/2010 | Cho et al. | |
| 2011/0141108 A1 | 6/2011 | Masuda | |
| 2011/0149050 A1 | 6/2011 | Imada | |
| 2012/0098856 A1* | 4/2012 | Thorpe | H04N 13/007 345/629 |
| 2012/0127155 A1* | 5/2012 | Deshpande | H04N 13/0022 345/419 |

FOREIGN PATENT DOCUMENTS

| | | |
|---|---|---|
| JP | 2004-362218 A | 12/2004 |
| JP | 2005-316790 A | 11/2005 |
| JP | 2009-229752 A | 10/2009 |
| JP | 2010-55266 A | 3/2010 |
| WO | WO 2008/062586 A1 | 5/2008 |
| WO | WO 2010/140332 A1 | 12/2010 |

OTHER PUBLICATIONS

Chinese Office Action and Search Report, dated May 26, 2015, for Chinese Application No. 201280017005.4, including a partial English translation.
Extended European Search Report, dated Aug. 5, 2014, for European Application No. 12765796.3.
European Office Action dated Dec. 23, 2015, for European Application No. 12765796.3.
Chinese Office Action, dated Jun. 23, 2016, for Chinese Application No. 201280017005.4, together with an English translation thereof.
European Summons to attend oral proceedings pursuant to Rule 115(1) EPC, dated Feb. 2, 2017, for European Application No. 12765796.3.

* cited by examiner

FIG.4
(A)
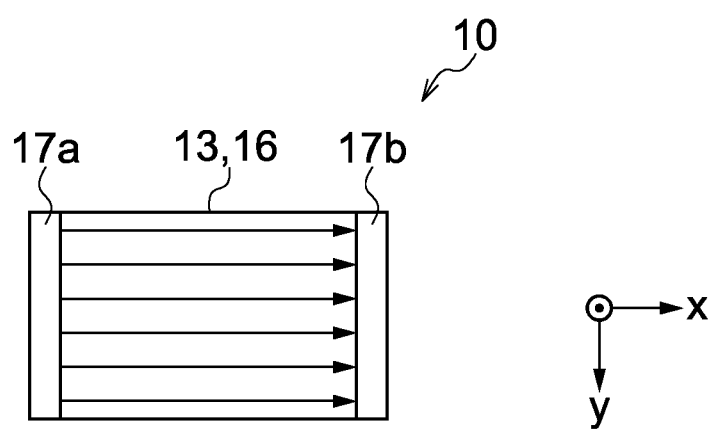
(B)
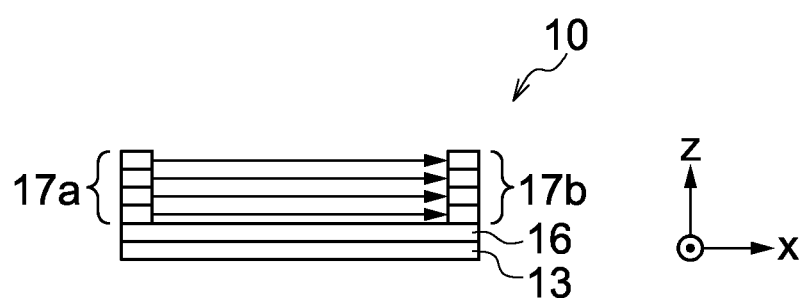
(C)
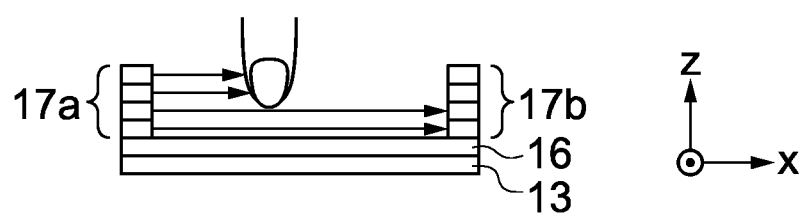

FIG.7
(A) 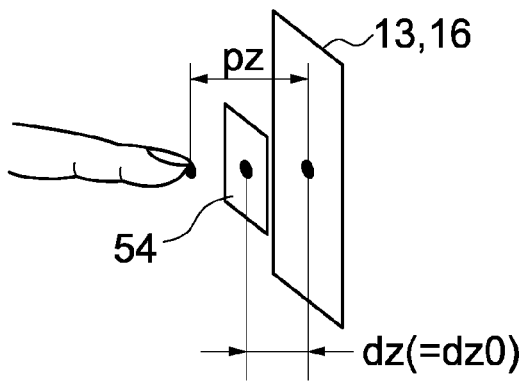
(B) 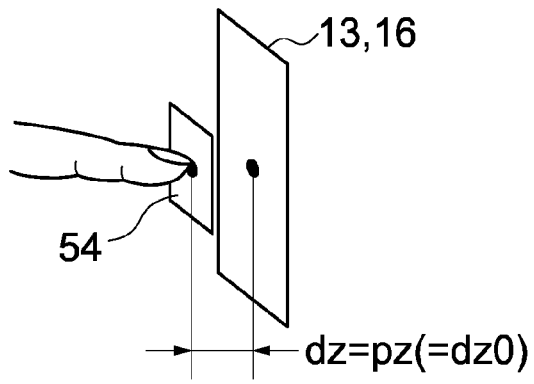
(C) 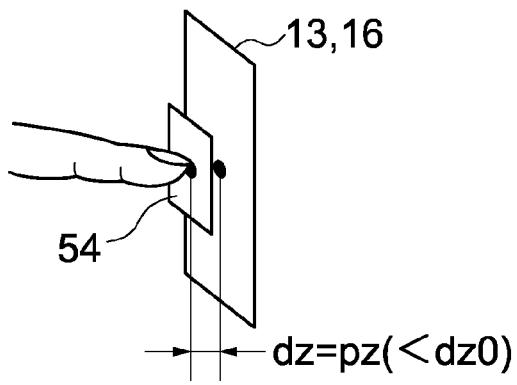
(D) 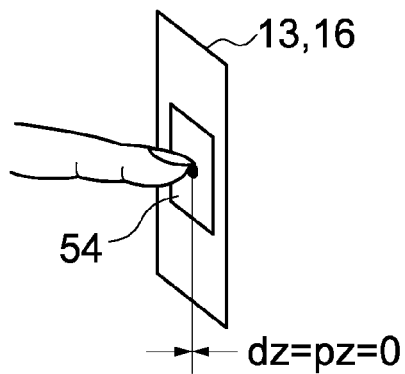

RELATED ART

STEREOSCOPIC DISPLAY DEVICE, METHOD FOR ACCEPTING INSTRUCTION, AND NON-TRANSITORY COMPUTER-READABLE MEDIUM FOR RECORDING PROGRAM

CROSS-REFERENCE TO RELATED APPLICATIONS

This application is a continuation application and claims the priority benefit under 35 U.S.C. §120 of PCT Application No. PCT/JP2012/055176 filed on Mar. 1, 2012 which application designates the U.S., and also claims the priority benefit under 35 U.S.C. §119 of Japanese Patent Application No. 2011-079295 filed on Mar. 31, 2011, which applications are all hereby incorporated by reference in their entireties.

BACKGROUND OF THE INVENTION

Field of the Invention

The present invention relates to a stereoscopic display device, instruction acceptance method and program that are able not to damage user's stereoscopic effect when stereoscopically displaying an instruction image to be instructed by an indicator and receiving a user's instruction.

Description of the Related Art

In the related art, there is known a stereoscopic display device in which, when a 3D button image formed with the button image for the right eye and the button image for the left eye is displayed and the user touches a touch sensor arranged on display screen by an indicator such as a finger and a touch pen, the touched position on the display screen is detected (for example, see PTL 1: Japanese Patent Application Laid-Open No. 2010-55266).

However, as illustrated in FIG. 17, when a user's finger 92 approaches a display screen 90 on which a touch sensor is provided, the finger 92 and a button stereoscopic image 94 are overlapped and seen as if the finger 92 penetrates the button, and therefore there is a problem that the user feels odd. That is, while a button is pressed by a finger in the case of a hardware button, a button stereoscopic image merely covers a finger in the case of a virtual 3D button even if press operation by the finger is performed, and therefore there is a problem that the observer's stereoscopic effect is damaged.

The present invention is made in view of the above and it is an object to provide a stereoscopic display device and instruction acceptance method and program that are able not to damage user's stereoscopic effect when stereoscopically displaying an instruction image to be instructed by an indicator and accepting a user's instruction.

SUMMARY OF THE INVENTION

To achieve the object, the present invention provides a stereoscopic display device including: a stereoscopic display unit for displaying an instruction stereoscopic image formed with an instruction left-eye image and an instruction right-eye image to be instructed by an indicator; a space sensor that detects an instruction position which is instructed by the indicator on a display screen of the stereoscopic display unit and detects an interval between the display screen of the stereoscopic display unit and the indicator; a determination unit for determining whether the instruction position detected by the space sensor is within a detection area corresponding to the instruction stereoscopic image, and accepting an instruction corresponding to the instruction stereoscopic image; a disparity amount decision unit for deciding a disparity amount between the instruction left-eye image and the instruction right-eye image displayed by the stereoscopic display unit, and decreasing the disparity amount between the instruction left-eye image and the instruction right-eye image according to a decrease in the interval detected by the space sensor; and an image processing unit for displaying the instruction stereoscopic image on the stereoscopic display unit by the disparity amount decided by the disparity amount decision unit.

Also, the present invention provides a stereoscopic display device including: a stereoscopic display unit for displaying an instruction stereoscopic image formed with an instruction left-eye image and an instruction right-eye image to be instructed by an indicator; a touch sensor that is arranged on a display screen of the stereoscopic display unit and detects an instruction position touched by the indicator; a determination unit for determining whether the instruction position in which the touch is detected by the touch sensor is within a detection area corresponding to the instruction stereoscopic image, and accepting an instruction corresponding to the instruction stereoscopic image; a space sensor that detects an interval between a touch surface of the touch sensor or the display screen of the stereoscopic display unit and the indicator; a disparity amount decision unit for deciding a disparity amount between the instruction left-eye image and the instruction right-eye image displayed by the stereoscopic display unit, and decreasing the disparity amount between the instruction left-eye image and the instruction right-eye image according to a decrease in the interval detected by the space sensor; and an image processing unit for displaying the instruction stereoscopic image on the stereoscopic display unit by the disparity amount decided by the disparity amount decision unit.

According to the present invention, since the interval between the display screen and the indicator (e.g., a finger or a touch pen) is detected by the space sensor and the disparity amount between the instruction left-eye image and the instruction right-eye image is decreased according to the decrease in the detected interval, it is possible not to damage the user's stereoscopic effect.

The "instruction stereoscopic image" is an instruction image to be instructed by the indicator and denotes an image that is stereoscopically displayed in this specification. Specific examples of the "instruction stereoscopic image" include a 3D image of a so-called button type (e.g., 3D button, 3D icon or 3D thumbnail) and a 3D image of a so-called slide type (e.g., 3D slide bar). The touch operation type (e.g., button operation or slide operation) and the image display format are not especially limited.

In the button-type 3D image (i.e., 3D button image), by the present invention, since it is possible to change the pop-up amount of a stereoscopic image such that the stereoscopic image is pressed together with an indicator such as a finger and a touch pen, a feeling of visual strangeness can be eliminated. Even when the button-type 3D image is not provided, there is provided an effect of causing the user to accurately recognize the interval between the indicator and the display screen.

In one embodiment, when an instruction of the indicator is detected by the space sensor or the touch sensor, the image processing unit switches the instruction stereoscopic image to plane display. That is, since the instruction image is switched from stereoscopic display to plane display when the indicator touches, it is possible to feel by not only the sense of touch but also the sense of sight that the interval between the indicator and the display screen becomes zero, which is preferable.

Moreover, the present invention provides an instruction acceptance method using a stereoscopic display unit for displaying an instruction stereoscopic image formed with an instruction left-eye image and an instruction right-eye image to be instructed by an indicator and a space sensor that detects an instruction position which is instructed by the indicator on a display screen of the stereoscopic display unit and detects an interval between the display screen of the stereoscopic display unit and the indicator, including: a step of displaying the instruction stereoscopic image on the stereoscopic display unit by a predetermined disparity amount; a step of acquiring an interval between a display screen of the stereoscopic display unit and the indicator by the space sensor; a step of decreasing a disparity amount between the instruction left-eye image and the instruction right-eye image according to a decrease in the acquired interval; and a step of accepting an instruction corresponding to the instruction stereoscopic image by deciding whether the instruction position detected by the space sensor is within a detection area corresponding to the instruction stereoscopic image.

Moreover, the present invention provides an instruction acceptance method using a stereoscopic display unit for displaying an instruction stereoscopic image formed with an instruction left-eye image and an instruction right-eye image to be instructed by an indicator, a touch sensor that is arranged on a display screen of the stereoscopic display unit and detects a position touched by the indicator and a space sensor that detects a change in an interval on a space between a touch surface of the touch sensor or the display screen of the stereoscopic display unit and the indicator, including: a step of displaying the instruction stereoscopic image on the stereoscopic display unit by a predetermined disparity amount; a step of acquiring an interval between a display screen of the stereoscopic display unit and the indicator from the space sensor; a step of decreasing a disparity amount between the instruction left-eye image and the instruction right-eye image according to a decrease in the interval acquired from the space sensor; and a step of accepting an instruction corresponding to the instruction stereoscopic image by deciding whether the position in which the touch is detected by the touch sensor is within a detection area corresponding to the instruction stereoscopic image.

Moreover, the present invention provides a program that causes a computer to execute the instruction acceptance method, and a computer-readable recording medium that stores the program.

According to the present invention, it is possible not to damage user's stereoscopic effect when stereoscopically displaying an instruction image for touch operation and accepting a user's instruction.

BRIEF DESCRIPTION OF THE DRAWINGS

FIG. 4 is a diagram illustrating a stereoscopic device using an infrared light sensor as a space sensor.

FIG. 7 is a pattern diagram illustrating a state where pop-up amount dz of an instruction stereoscopic image is reduced according to the reduction of the interval between an indicator and a display screen.

DETAILED DESCRIPTION OF THE PREFERRED EMBODIMENTS

In the following, embodiments of the present invention are described in detail according to the accompanying drawings.

Figure 1:
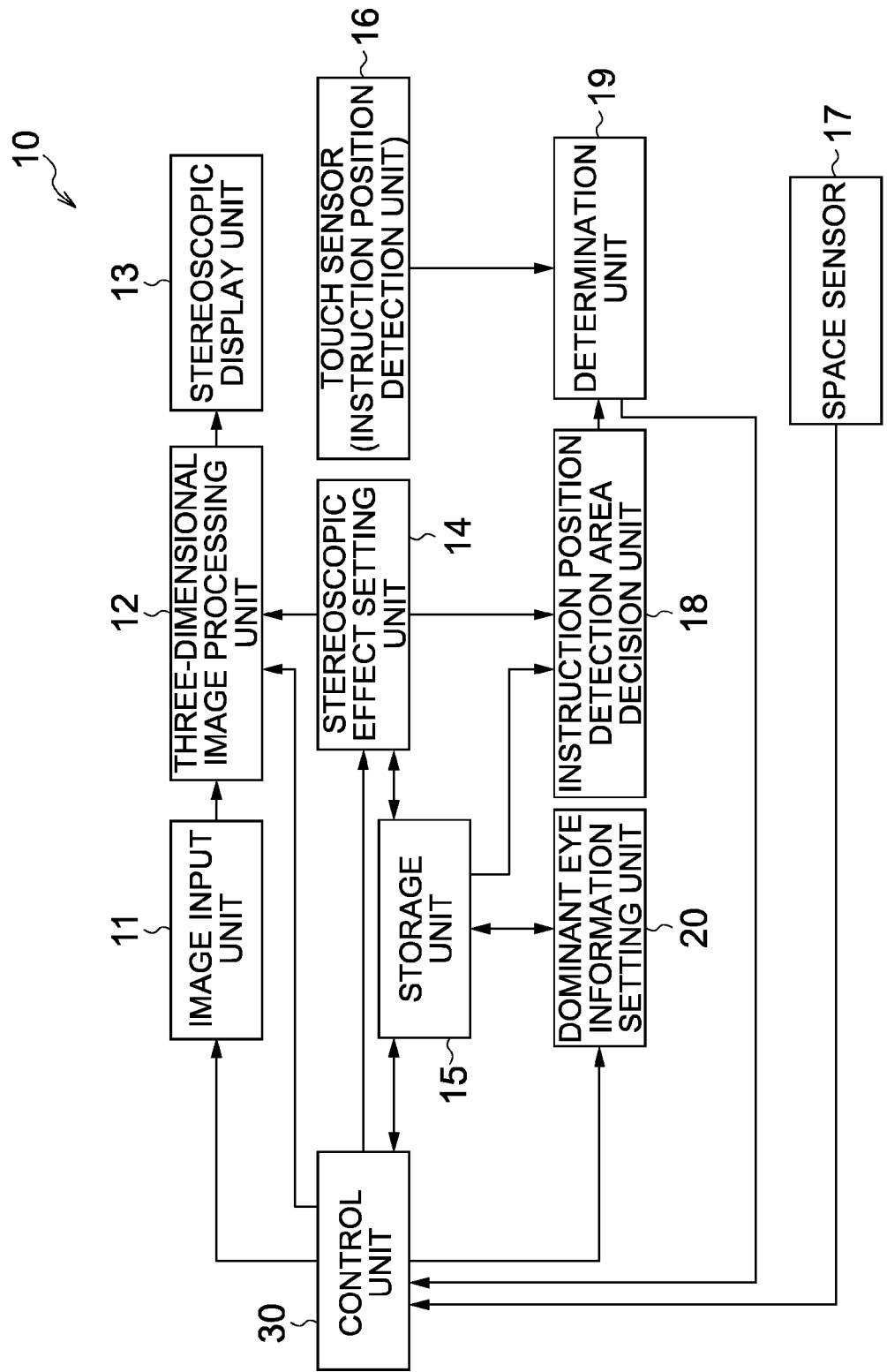
FIG. 1 is a block diagram illustrating the entire configuration of an example of stereoscopic display device according to the present invention.

FIG. 1 is a block diagram illustrating a configuration example of a stereoscopic display device 10 of one embodiment.

An image input unit 11 inputs a 2D image of one viewpoint. A three-dimensional image processing unit 12 converts the 2D image of one aspect output from the image input unit 11 into a 3D image formed with 2D images of multiple viewpoints (i.e., the right eye image for the right eye and the left eye image for the left eye). A stereoscopic display unit 13 performs stereoscopic display of the 3D image. A touch sensor 16 is arranged on the display screen of the stereoscopic display unit 13 and detects the instruction position (x-y coordinates) touched by an indicator such as a finger and a touch pen by the user on the display screen.

Here, in the specification, "2D" means the two dimensions (i.e., plane) and "3D" means three dimensions (i.e., solid). That is, a "2D image" denotes a plane image and a "3D image" denotes a stereoscopic image (i.e., image that can be viewed stereoscopically).

Figure 2:
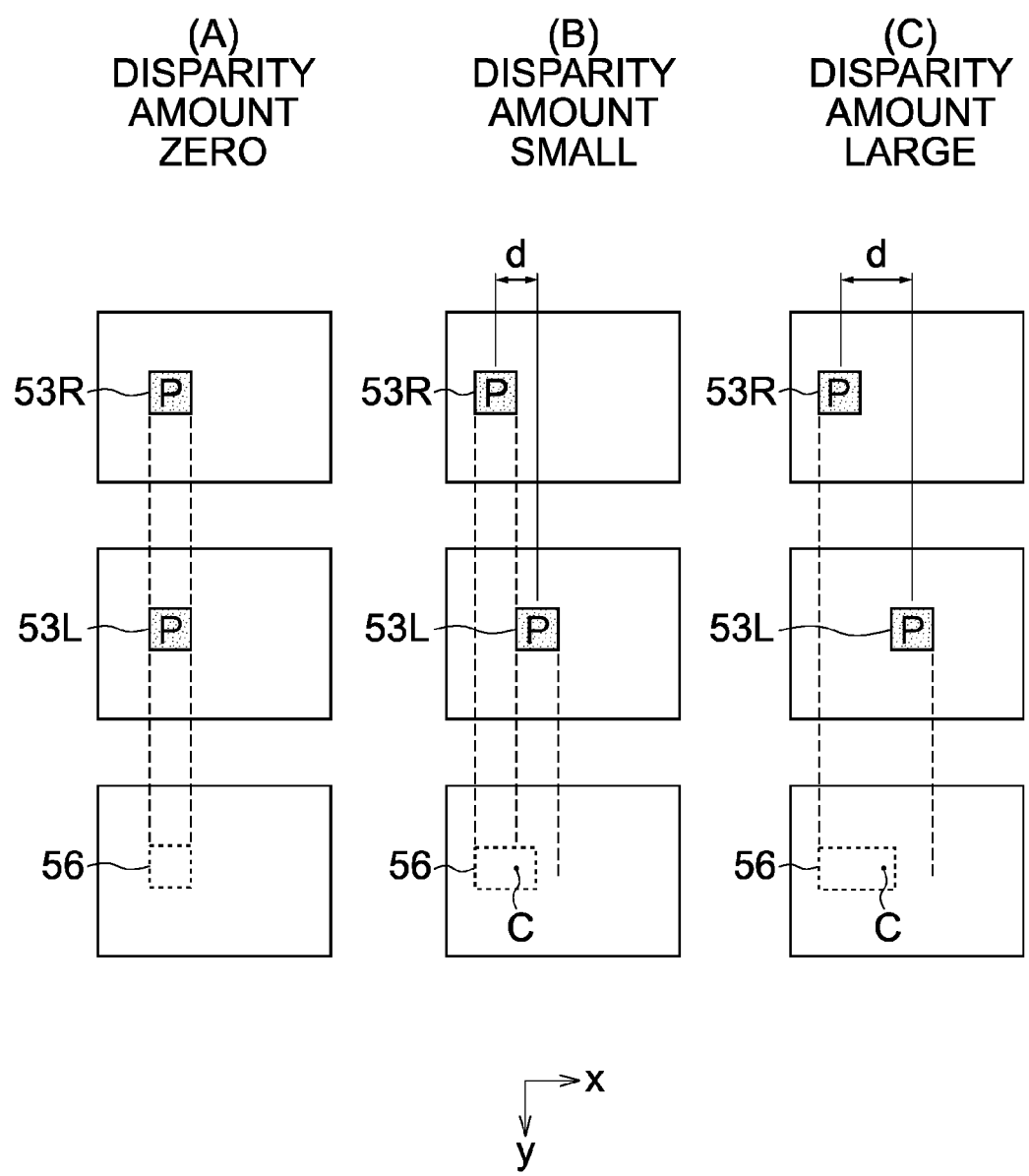
FIG. 2 is an explanatory diagram illustrating an example of an instruction stereoscopic image and instruction position detection area.

Parts (A) to (C) of FIG. 2 illustrate a state where, in order to accept a user's instruction in the stereoscopic display unit 13 and the touch sensor 16, instruction 2D images of multiple viewpoints (i.e., instruction left-eye image 53L and instruction right-eye image 53R) are displayed on the display screen of the stereoscopic display unit 13. The part (A) of FIG. 2 illustrates a case where the disparity amount is zero (i.e., no pop-up), part (B) of FIG. 2 illustrates a case where the disparity amount is small (i.e., small pop-up amount), and part (C) of FIG. 2 illustrates a case where the disparity amount is maximum (i.e., maximum pop-up). A reference numeral 56 denotes an instruction position detection area in which an instruction position touched on the display screen (i.e., touch surface) is detected to be valid. Although it is not recognized as a stereoscopic image in the case of part (A) of FIG. 2, by shifting an instruction left-eye image 53L and an instruction right-eye image 53R by disparity amount d in the x direction (i.e., horizontal direction) and displaying them as illustrated in parts (B) and (C) of FIG. 2, the user recognizes the instruction images as a stereoscopic image (i.e., 3D image) popped out on the near side of the display screen.

A space sensor 17 denotes a sensor that detects a three-dimensional position of an indicator (e.g., a finger and a touch pen), which detects the interval between the display screen of the stereoscopic display unit 13 (or the touch surface of the touch sensor 16) and the indicator. Here, the touch sensor 16 is thin compared with the movement distance of the indicator and therefore the front surface (i.e., touch surface) of the touch sensor 16 and the display screen are recognized as substantially the same. In the following, an explanation is given with an assumption that the space sensor 17 detects the interval between the display screen of the stereoscopic display unit 13 and the indicator.

A stereoscopic effect setting unit 14 has a function of accepting setting input operation with respect to the magnitude (or intensity) of stereoscopic effect of an instruction 3D image and causing a storage unit 15 to store the disparity amount corresponding to the set and input magnitude of the stereoscopic effect as the initial disparity amount. For example, the stereoscopic effect setting unit 14 causes the stereoscopic display unit 13 to display a selection menu of "strong," "medium" and "weak" of stereoscopic effect to accept a selection input of the stereoscopic effect level from the user, and causes the storage unit 15 to store the disparity amount corresponding to the stereoscopic effect level.

A dominant eye information setting unit 20A accepts a setting input of user's dominant eye information and stores the set and input dominant eye information in the storage unit 15. For example, a selection input of the right or left eye is accepted from the user by asking the user a question as to which of the right and left eyes the dominant eye is. Here, an explanation is given to a configuration to acquire the dominant eye information by the user's setting input operation, and a mode to acquire the dominant eye information by automatically determining the user's dominant eye is described later.

An instruction position detection area decision unit 18 decides an instruction position detection area (i.e., reaction area) on the display screen of the stereoscopic display unit 13 on the basis of at least the dominant eye information. For example, in a case where the dominant eye information is acquired, at least one of the position, size and shape on the display screen in the instruction position detection area is switched depending on whether the user's dominant eye is the right eye or it is the left eye.

A determination unit 19 determines whether the instruction position in which the instruction position detection unit 16 detects a touch is within a range of the instruction position detection area (which is an area corresponding to the instruction 3D image) decided by the instruction position detection area decision unit 18, so as to accept an instruction corresponding to the instruction 3D image. That is, the determination unit 19 determines whether a user's instruction corresponding to the instruction 3D image exists.

A control unit 30 controls each unit of the stereoscopic display device 10. Moreover, the control unit 30 decides the disparity amount between the instruction left-eye image 53L and the instruction right-eye image 53R, as a disparity amount decision unit. The control unit 30 changes the disparity amount according to the change in the interval on the space between the display screen of the stereoscopic display unit 13 and the indicator, which is detected by the space sensor 17. The control unit 30 of this example decreases the disparity amount between the instruction right-eye image 53R and the instruction left-eye image 53L, according to the decrease in the interval detected by the space sensor 17. Moreover, when the touch of the indicator is detected by the touch sensor 16, the control unit 30 of this example performs control to switch the instruction 3D image to plane display. In order to switch the instruction 3D image to plane display, there are a switching mode to display only one of the instruction right-eye image and instruction left-eye image on the stereoscopic display unit 13 and a mode to change the disparity amount to zero.

Next, the relationship between the dominant eye and the user's touch position is described. If the display illustrated in parts (B) and (C) of FIG. 2 is performed, although a stereoscopic image appears in the intermediate between the center position of the instruction right-eye image 53R and the center position of the instruction left-eye image 53L, in a case where the user gives an instruction by a finger or a touch pen while seeing the stereoscopic image, the instruction position is a position depending on the user's dominant eye. For example, in a case where the user's dominant eye is the right eye, the user tends to instruct a position closer to the center position of the instruction right-eye image 53R than intermediate position C between the center position of the instruction right-eye image 53R and the center position of the instruction left-eye image 53L. Therefore, in a case where the dominant eye information is acquired, the instruction position detection area decision unit 18 switches at least one of the position, size and the shape of the instruction position detection area according to whether the user's dominant eye is the right eye or it is the left eye. For example, in a case where the dominant eye information is acquired, the instruction position detection area is arranged in a display position closer to the instruction image of the dominant eye among the instruction right-eye image and the instruction left-eye image. For example, the instruction position detection area including the display area of instruction right-eye image 53R is set. By this means, it is possible to correctly determine an instruction intended by the user.

In FIG. 1, the image input unit 11, the three-dimensional image processing unit 12, the instruction position detection area decision unit 18, the determination unit 19 and the control unit 30 are formed with, for example, a microprocessor (CPU). The stereoscopic effect setting unit 14 and the dominant eye information setting unit 20 are chiefly formed with, for example, a microprocessor and the touch sensor 16. The stereoscopic effect setting unit 14 and the dominant eye information setting unit 20 may be formed with other input devices such as a key and a mouse, without using the touch sensor. The storage unit 15 is formed with, for example, a memory. However, the processing in each unit may be performed by software according to a program recorded in a computer-readable non-temporary recording medium such as the storage unit 15 or may be performed by hardware by a circuit.

Next, an example of the space sensor 17 that can detect the three-dimensional position of an indicator is described.

Figure 3:
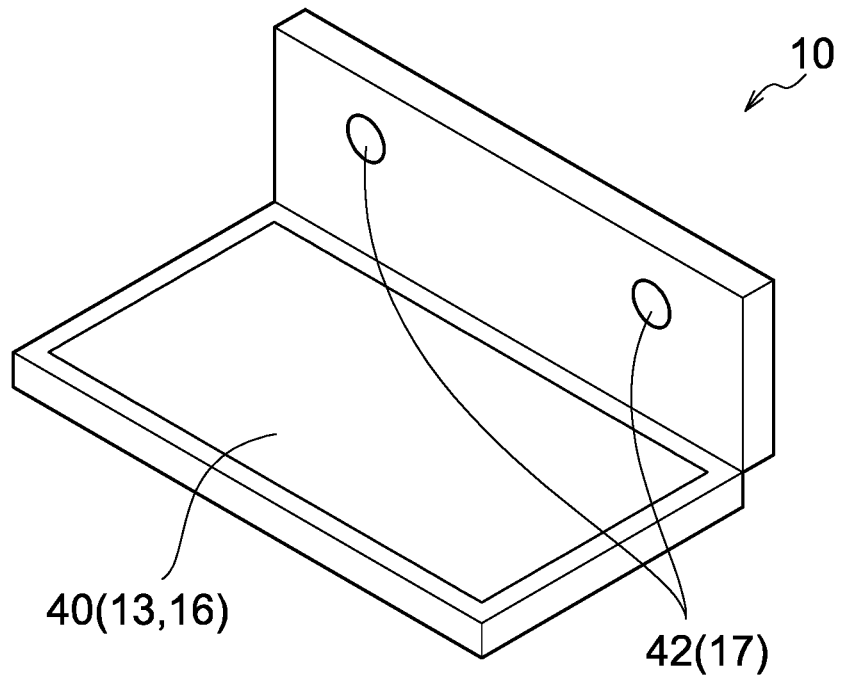
FIG. 3 is a diagram illustrating an appearance of a stereoscopic display device using a stereoscopic camera as a space sensor.

FIG. 3 illustrates the stereoscopic display device 10 in a case where a compound-eye stereoscopic camera 42 (hereafter referred to as "compound-eye 3D camera") is used as the space sensor 17 of FIG. 1. The compound-eye 3D camera 42 is a camera including optical systems and imaging elements of multiple viewpoints, and, based on imaged images of multiple viewpoints photographed by the multiple imaging elements, detects the three-dimensional position of an indicator to touch a touch panel 40 including the stereoscopic display unit 13 and the touch sensor 16.

Here, in FIG. 3, although a case is exemplified where the compound-eye 3D camera 42 is used, a simple-eye 3D camera that performs pupil division of a single imaging optical system to perform stereoradiography may be used as the space sensor 17.

As illustrated in parts (A) and (B) of FIG. 4, an infrared light sensor including an infrared light emission unit 17a that emits infrared light and an infrared light reception unit 17b that receives the infrared light may be used as the space sensor 17. Part (A) of FIG. 4 denotes a plan view in which the stereoscopic display device 10 is seen from the z direction orthogonal to the display screen (i.e., x-y plane). Part 3(B) of FIG. 4 denotes a cross-sectional view in which the cross-sectional surface of the stereoscopic display device 10 along the z direction is seen. The space sensor 17 of this example has a configuration in which sets of infrared light sensors including the infrared light emission unit 17a and the infrared light reception unit 17b are layered in the z direction. As illustrated in part (C) of FIG. 4, by detecting in which set among the sets of the infrared light sensors 17a and 17b infrared light is blocked by an indicator, the interval between the indicator and the display screen is detected. The element intervals between the infrared light sensors in the Z direction are decided according to the resolving power required for interval detection between the indicator and the display screen.

Here, although the stereo camera (i.e., stereoscopic imaging sensor) and the infrared light sensor have been introduced as the space sensor 17, it is needless to say that other kinds of sensors may be used. For example, a capacitance type touch sensor (or touch panel) may be used as a space sensor.

Figure 5:
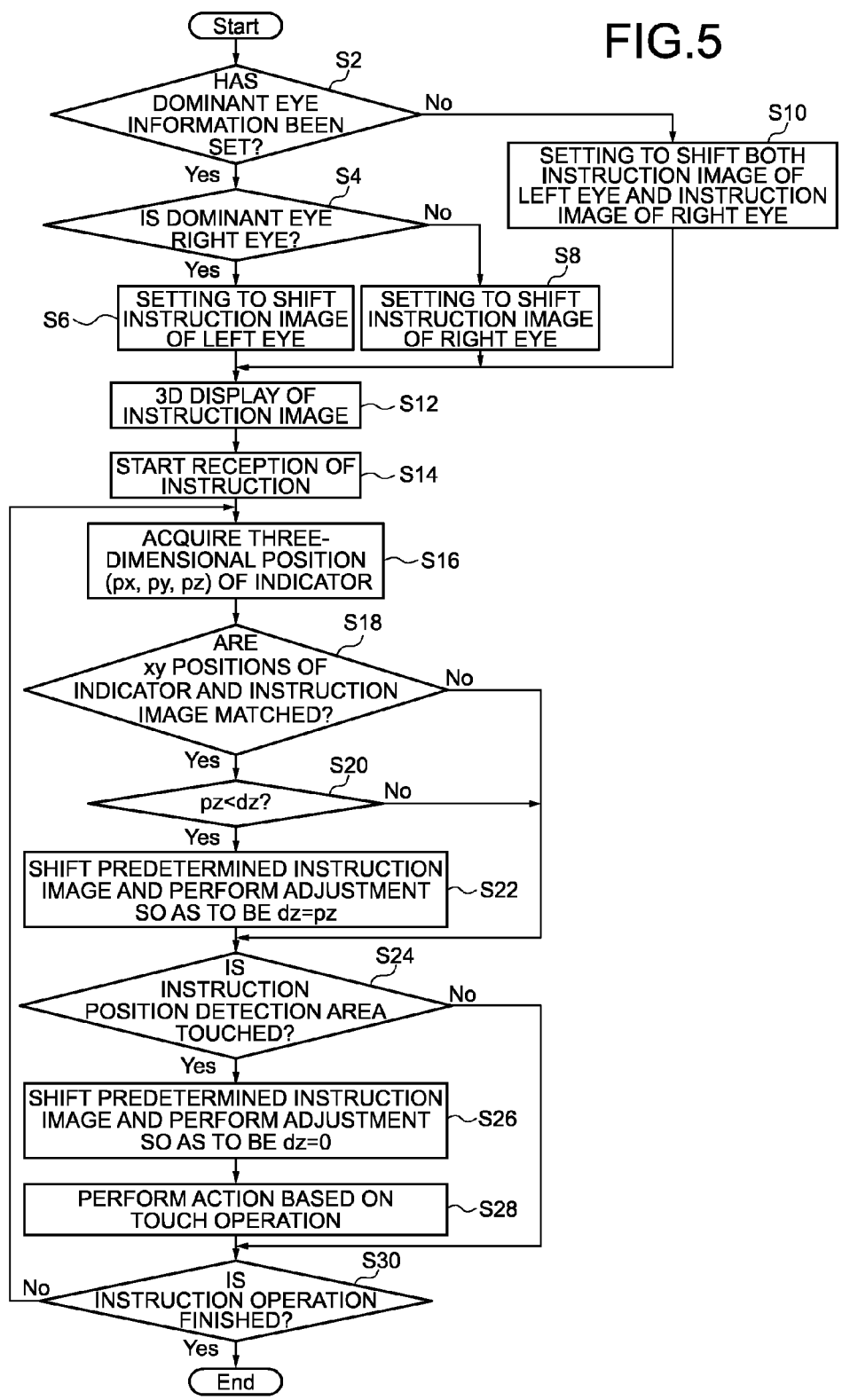
FIG. 5 is a flowchart illustrating a flow of an example of an instruction reception device.

FIG. 5 is a flowchart illustrating an instruction reception processing example in the stereoscopic display device 10a in FIG. 1. This processing is performed according to a program by control of a microprocessor forming the control unit 30. It is assumed that an instruction 2D image of one viewpoint is input in the image input unit 11 before this processing is started.

First, it is determined whether dominant eye information has been set (step S2). That is, it is decided whether the dominant eye information is stored in the storage unit 15.

In a case where the dominant eye information has been set, it is decided whether the observer's dominant eye is the left eye or it is the right eye, based on the dominant eye information (step S4). In a case where the dominant eye is the right eye, notice is given in advance to the three-dimensional image processing unit 12 such that the instruction left-eye image is shifted to the instruction right-eye image side and displayed on the stereoscopic display unit 13 when the indicator approaches the display screen (step S6). In a case where the dominant eye is the left eye, notice is given in advance to the three-dimensional image processing unit 12 such that the instruction right-eye image is shifted to the instruction left-eye image side and displayed on the stereoscopic display unit 13 when the indicator approaches the display screen (step S8). Thus, by setting shift information corresponding to the dominant eye information beforehand, when the indicator approaches the display screen of the stereoscopic display unit 13, image processing is performed which makes the display position of an instruction image for the eye that is not the dominant eye (e.g., instruction left-eye image) approach the display position of an instruction image for the dominant eye (e.g., instruction right-eye image).

In a case where the dominant eye information has not been set, notice is given in advance to the three-dimensional image processing unit 12 such that both the instruction left-eye image and the instruction right-eye image are shifted and displayed on the stereoscopic display unit 13 (step S10). That is, since the dominant eye information is not provided, it is set in advance so as to perform default processing that, when the indicator approaches the display screen of the stereoscopic display unit 13, both the instruction left-eye image and the instruction right-eye image are made approach the center of the display positions of the both instruction images.

Subsequently, the instruction image is stereoscopically displayed on the stereoscopic display unit 13 (step S12). That is, the instruction 2D image of one viewpoint acquired by the image input unit 11 is converted into the instruction 3D image including the instruction left-eye image and the instruction right-eye image by the three-dimensional image processing unit 12 on the basis of the initial disparity amount set by the stereoscopic effect setting unit 14, and the instruction 3D image is displayed on the stereoscopic display unit 13.

Subsequently, acceptance of an observer's instruction is started (step S14). In this example, the instruction position detection area is decided by the instruction position detection area decision unit 18 on the basis of the dominant eye information stored in the storage unit 15, and the instruction position detection area is notified to the determination unit 19.

Subsequently, the three-dimensional position (px, py, pz) of the indicator is acquired from the space sensor 17 (step S16). In this example, the three-dimensional position of the indicator is measured by the compound-eye 3D camera 42 in FIG. 3. Here, px and py denote coordinates on the plane parallel to the display screen, and px shows a position on the horizontal direction in this example. Moreover, pz shows the distance (or interval) from the display screen.

Subsequently, it is determined whether the x-y position (px, py) of the indicator and the x-y position of the instruction 3D image are matched (step S18). That is, it is determined whether the indicator's x-y position (px, py) detected by the space sensor 17 is within a range in the x-y plane of the instruction 3D image. In a case where a plurality of instruction 3D images are displayed on the stereoscopic display unit 13, an instruction 3D image facing the indicator is specified among the plurality of instruction 3D images.

In a case where there is the instruction 3D image facing the indicator, it is determined whether pz<dz is established with respect to pop-up amount dz of the instruction 3D image and interval pz between the indicator and the display screen (step S20). Initial disparity amount d0 (i.e., distance between the right and left instruction images) and pop-up amount dz0 corresponding thereto are already known, and it is determined first whether a pz<dz0 is established. Here, according to distance r between the observer and the display screen and interval s between both eyes of the observer, dz0 is decided by dz0=(d0×r)/(d0+s). As an example, in the case of LCD of about three inches, it is possible to calculate s=65 mm and r=300 mm. Regarding r, an accurate value may be calculated using a compound-eye camera or distance sensor directed to the observer. Also, face detection and facial part detection may be performed to detect the positions of observer's eyes and calculate an accurate value of s.

Figure 6:
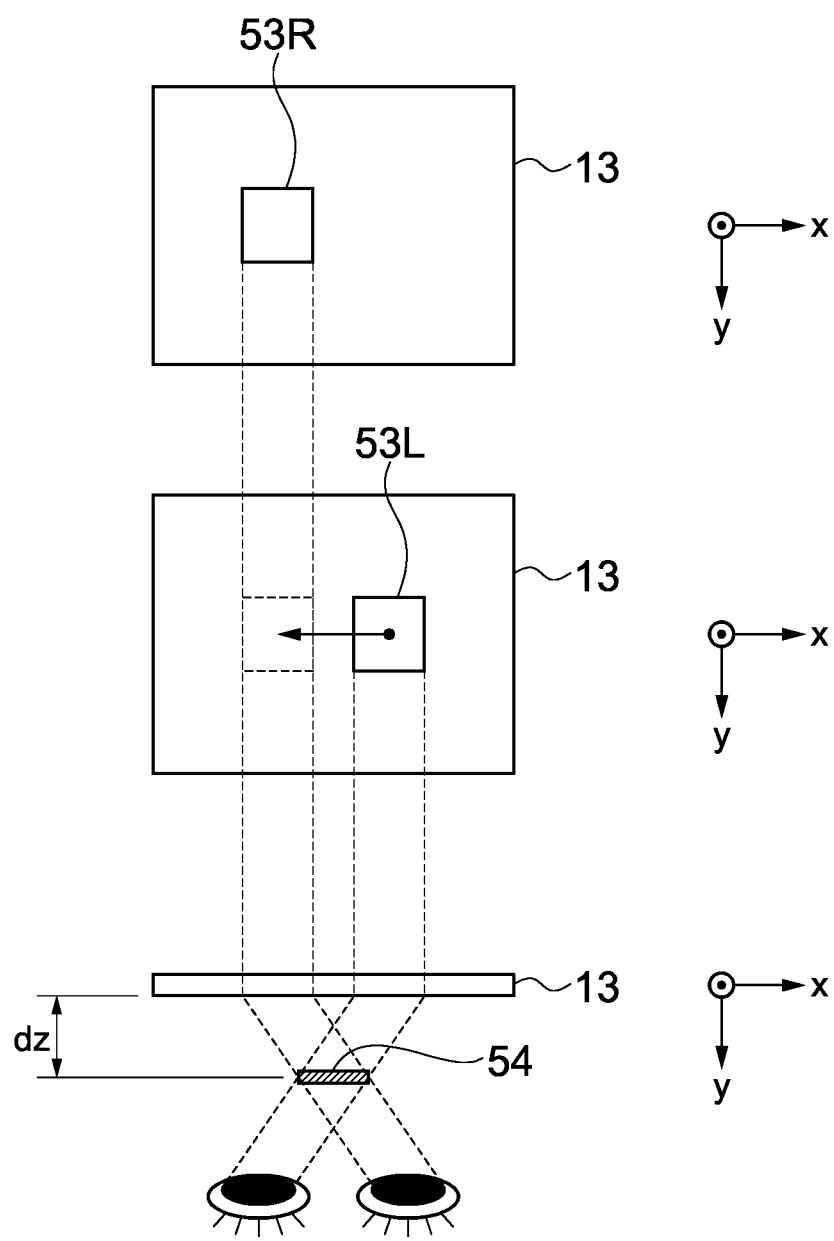
FIG. 6 is an explanatory diagram for an example where an instruction image for the dominant eye is approached to an instruction image for the eye that is not the dominant eye.

In a case where the instruction 3D image facing the indicator exists and pz<dz is established, disparity amount d between the instruction left-eye image and the instruction right-eye image is adjusted such that dz=pz is established by shifting at least one of the instruction left-eye image and the instruction right-eye image in the horizontal direction (i.e., x direction) by the three-dimensional image processing unit 12 (step S22). That is, based on the shift information set in step S6, S8 or S10, the display position of the instruction image for the eye that is not the dominant eye is made approach the display position of the instruction image for the dominant eye. FIG. 6 typically illustrates a state where the instruction left-eye image 53L for the left eye is made approach the right-eye instruction right-eye image 53R for the right eye when the dominant eye is the right eye. Thus, when the disparity amount is decreased according to the decrease in interval dz detected by the space sensor 17, and a stereoscopic image 54 of the instruction 3D image is moved and pressed by the indicator.

Subsequently, by the determination unit 19, it is determined whether the instruction position detection area is touched (step S24). That is, it is determined whether the indicator touches the instruction position detection area decided by the instruction position detection area decision unit 18 in the display screen (actually, the touch surface of the touch panel including the stereoscopic display unit 13 and the touch sensor 16).

In a case where it is determined that the instruction position detection area is touched, by shifting at least one of the instruction left-eye image and the instruction right-eye image in the horizontal direction (i.e., x direction), the disparity amount is adjusted such that pop-up amount dz of the instruction 3D image becomes zero (step S26). That is, the instruction 3D image is switched to 2D display by the three-dimensional image processing unit 12 on the basis of the shift information set in step S6, S8 or S10 such that the disparity amount between the instruction left-eye image and the instruction right-eye image becomes zero. In this example, it enters a state where only the instruction image for the dominant eye (e.g., the instruction right-eye image if the right eye is the dominant eye) is displayed.

Subsequently, an action corresponding to the touch operation is performed (step S28). That is, processing corresponding to the instruction 3D image is performed.

Subsequently, it is determined whether to terminate the processing (step S30), the processing is terminated in a case where it is terminated, and it returns to step S16 in a case where it is continued.

As described above using FIG. 5, when interval pz is smaller than initial pop-up amount dz0, pop-up amount dz is decreased according to the decrease in interval pz. This state is illustrated in parts (A) to (D) of FIG. 7.

In the state illustrated in part (A) of FIG. 7, since interval pz is larger than pop-up amount dz and a finger is in front of the stereoscopic image 54 of the 3D button, pop-up amount dz is not changed even if interval pz decreases. As illustrated in part (C) of FIG. 7, when interval pz is smaller than initial pop-up amount dz0, the control unit 30 decreases pop-up amount dz by decreasing the disparity amount according to the decrease in interval pz. As illustrated in part (D) of FIG. 7, when the touch of the finger is detected, the three-dimensional image processing unit 12 switches an instruction 3D image of the 3D button to 2D display. For example, it enters a state where only an instruction image of the dominant eye is displayed. Alternatively, the disparity amount is adjusted so as to become dz=0.

When the touching finger is apart from the display screen, the disparity amount of the 3D button may be increased according to the increase in interval pz detected by the space sensor 17. That is, like a case where FIG. 7 is seen in the reversed order from part (D), part (C) to part (B), pop-up amount dz may be increased according to the increase in interval pz. However, as illustrated in part (A) of FIG. 7, pop-up amount dz is not increased when interval pz is equal to or larger than initial pop-up amount dz0.

As illustrated in FIG. 7, although an example case has been described above where the relationship between interval pz and initial pop-up amount dz0 is that pop-up amount dz is gradually reduced when pz<dz0 is established, as another mode, it may be possible to set pop-up amount dz to zero when pz<dz0 is established. That is, it is switched to 2D display at the time of pz<dz0.

Moreover, a case has been described where the display position of an instruction image for the eye that is not the dominant eye is made approach the display position of an instruction image for the dominant eye, the instruction image may be shifted based on the acuity of the dominant eye. To be more specific, dominant eye information indicating the user's dominant eye and the acuity of the dominant eye is stored in advance in the storage unit 15, and, when the disparity amount is decreased according to the decrease in interval pz detected by the space sensor 17, based on the dominant eye information stored in the storage unit 15, the three-dimensional image processing unit 12 makes both the display position of the instruction right-eye image and the display position of the instruction left-eye image approach a position which is closer to the display position of the instruction image for the dominant eye than the intermediate position between the instruction right-eye image and the instruction left-eye image and which is closer to the display position of the instruction image for the dominant image by the rate according to the acuity of the dominant eye.

Next, an explanation is given to a control example where a plurality of instruction 3D images are displayed on the stereoscopic display unit 13.

Figure 8:
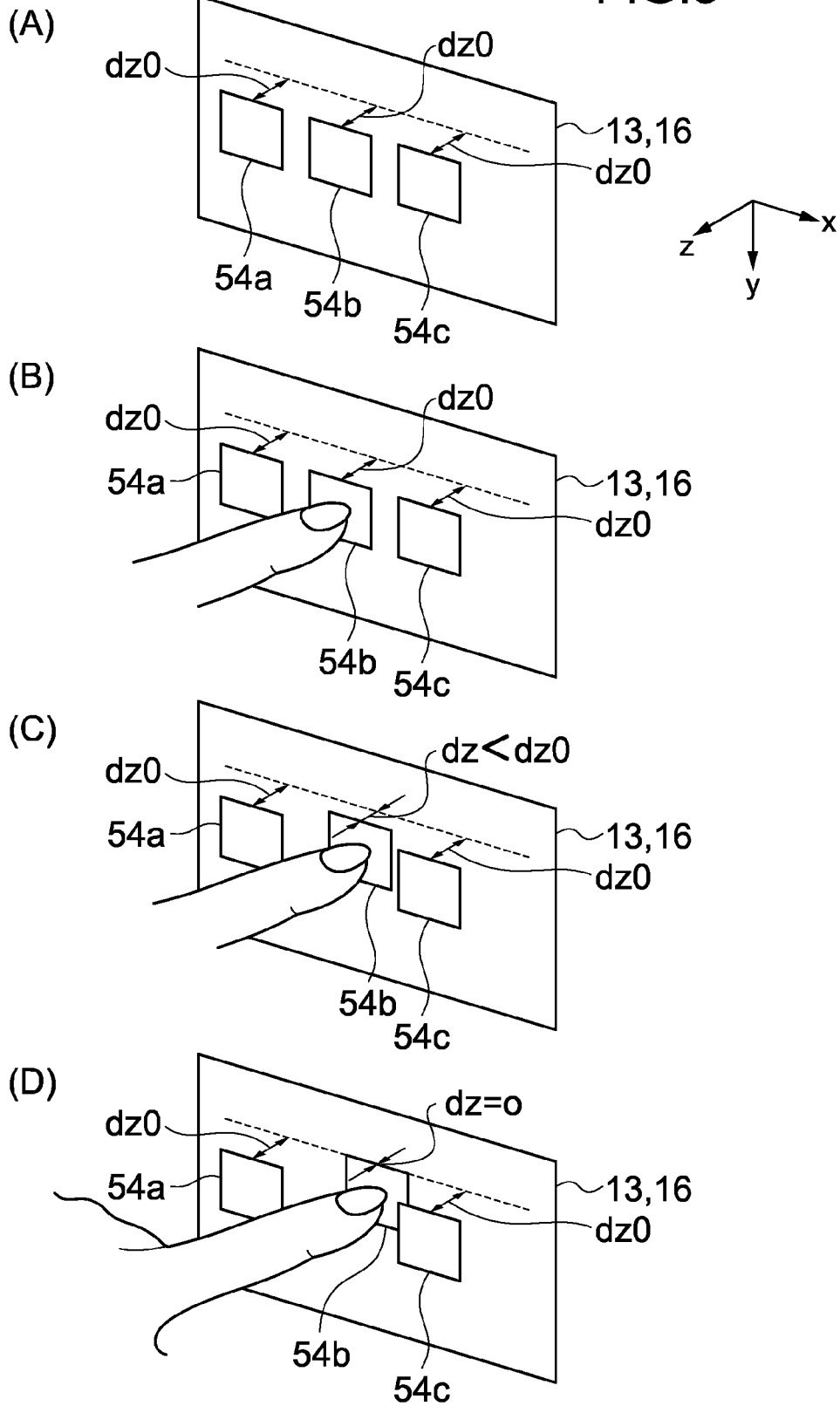
FIG. 8 is an explanatory diagram illustrating a case where the disparity amount of only an instruction stereoscopic image facing an indicator is reduced.

FIG. 8 is an explanatory drawing in a case where the disparity amount of only a 3D button facing an indicator is decreased.

In a case where a plurality of 3D buttons 54a, 54b and 54c are displayed, the three-dimensional image processing unit 12 specifies the 3D button 54b facing the finger on the basis of the finger's three-dimensional position detected by the space sensor 17, and, as illustrated in parts (B) and (C) of FIG. 8, pop-up amount dz is decreased by decreasing the disparity amount according to the decrease in interval pz for only the 3D button 54b facing the finger among the plurality of 3D buttons 54a, 54b and 54c.

Moreover, in a case where a plurality of 3D buttons 54a, 54b and 54c are displayed, the three-dimensional image processing unit 12 specifies the 3D button 54b on the basis of the finger's three-dimensional position detected by the space sensor 17, specifies the 3D button 54b facing the finger, and, as illustrated in part (D) of FIG. 8, switches only the 3D button 54b facing the finger to 2D display among the plurality of 3D buttons 54a, 54b and 54c when the finger's touch to the display screen is detected.

Moreover, in a case where a plurality of 3D buttons 54a, 54b and 54c are displayed, the three-dimensional image processing unit 12 specifies an instruction 3D image facing the indicator on the basis of the indicator's three-dimensional position acquired from the space sensor 17, specifies the 3D button 54b facing the finger on the basis of the finger's three-dimensional position detected by the space sensor 17, and, like a case where FIG. 8 is seen in the reversed order from part (D), part (C) to part (B), pop-up amount dz may be increased by increasing the disparity amount according to the increase in interval pz, only for the 3D button 54b facing the finger among the plurality of 3D buttons 54a, 54b and 54c.

Figure 9:
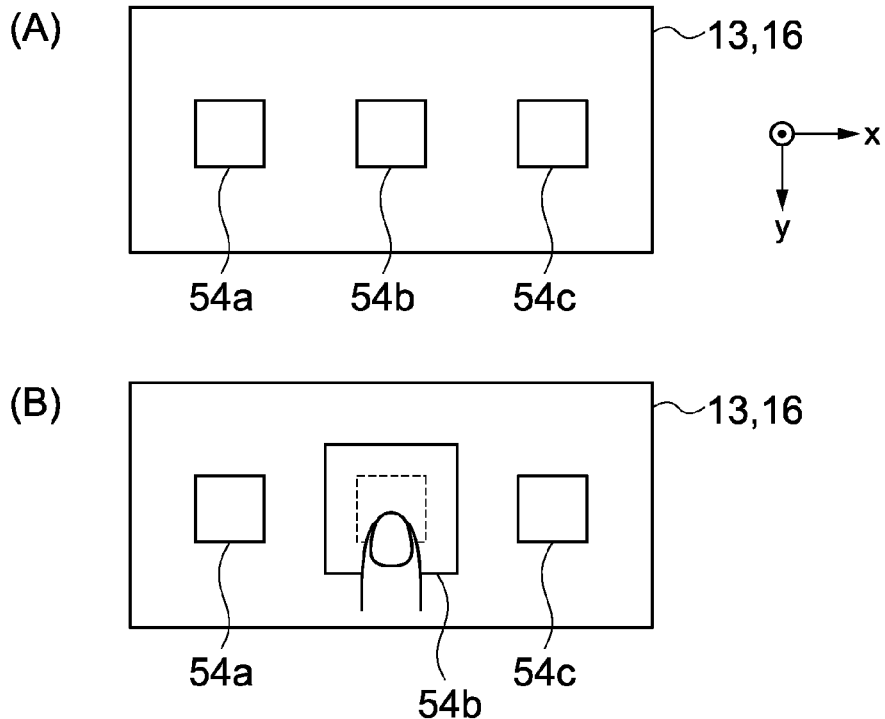
FIG. 9 is an explanatory diagram illustrating a case where the size of only an instruction stereoscopic image facing an indicator is increased.

FIG. 9 is an explanatory drawing in a case where the size of only an instruction 3D image facing an indicator is enlarged.

In a case where a plurality of 3D buttons 54a, 54b, and 54c are displayed, the three-dimensional image processing unit 12 specifies the 3D button 54b facing the finger on the basis of the finger's three-dimensional position detected by the space sensor 17, and, as illustrated in parts (A) and (B) of FIG. 9, the size of only the 3D button 54b facing the finger is enlarged among the plurality of 3D buttons 54a, 54b and 54c and the position of each of the 3D buttons 54a, 54b and 54c is not changed. Moreover, the instruction position detection area is expanded according to the expansion of the button size.

In a case where the size of only the 3D button facing the indicator is enlarged in this way, a 3D button to be pressed becomes easy to be pressed. Moreover, since the position of each 3D button is not changed, it is easily pressed even in a case where a 3D button to be pressed is changed to other 3D buttons.

Figure 10:
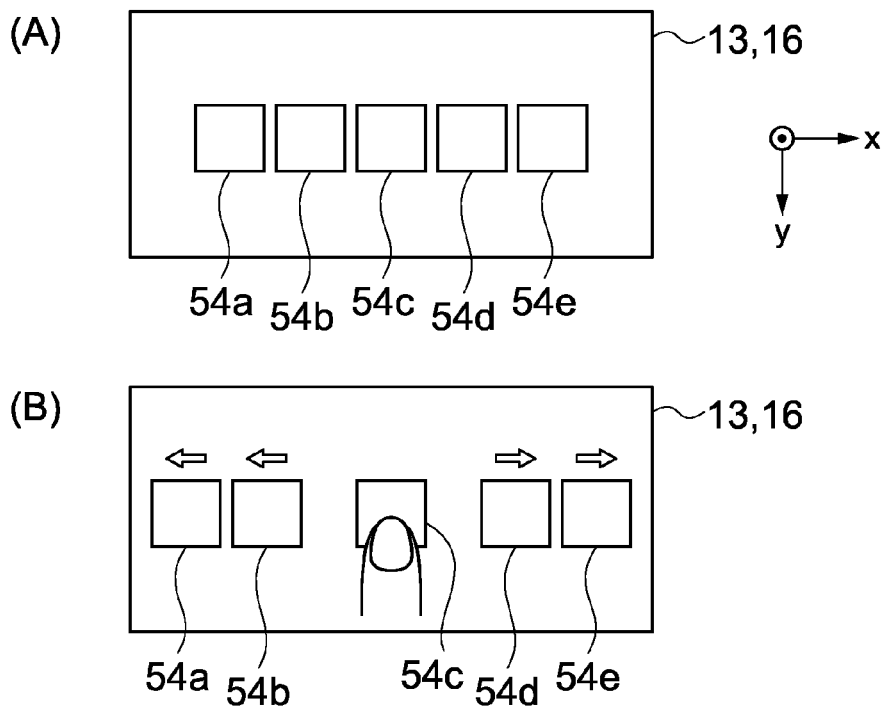
FIG. 10 is an explanatory diagram illustrating a case where surrounding instruction stereoscopic images are moved away from an instruction stereoscopic image facing an indicator.

FIG. 10 is an explanatory drawing in a case where surrounding instruction 3D images are moved away from an instruction 3D image facing an indicator.

In a case where a plurality of 3D buttons 54a, 54b and 54c are displayed, the three-dimensional image processing unit 12 specifies the 3D button 54c facing the finger on the basis of the finger's three-dimensional position detected by the space sensor 17, and, as illustrated in parts (A) and (B) of FIG. 10, the surrounding 3D buttons 54a, 54b, 54d and 54e (i.e., instruction 3D images) are moved away from the 3D button 54c (i.e., instruction 3D image) facing the finger.

In a case where other 3D buttons are moved away from the 3D button facing the indicator in this way, a 3D button to be pressed becomes easy to be pressed. However, when the finger moves in the arrangement direction of the buttons (e.g., x direction), the display positions are smoothly moved such that, in a case where a 3D button to be pressed is changed to another 3D button, the button does not become difficult to be pressed.

Next, the instruction position detection area decision in the instruction position detection area decision unit 18 shown in FIG. 1 is described.

Depending on whether the dominant eye information is stored in the storage unit 15 (i.e., whether the dominant eye information exists), the instruction position detection area decision unit 18 switches at least one of the position, size and shape of the instruction position detection area.

In a case where the dominant eye information exists, the instruction position detection area decision unit 18 makes the size of the instruction position detection area smaller than in a case where the dominant eye information is not provided.

In a case where the dominant eye information exists, depending on whether the user's dominant eye is the right eye or it is the left eye, the instruction position detection area decision unit 18 switches at least one of the position, size and shape of the detection area.

In a case where the dominant eye information exists, the instruction position detection area decision unit 18 arranges the detection area so as to be closer to the display position of the instruction image for the dominant eye out of the instruction right-eye image and the instruction left-eye image. Moreover, in a case where the dominant eye information exists, the instruction position detection area decision unit 18 decides the instruction position detection area such that at least part of the instruction image corresponding to the dominant eye out of the instruction right-eye image and the instruction left-eye image is included.

Next, an explanation is given to instruction position detection area decision in a case where the dominant eye information is not acquired.

Figure 11:
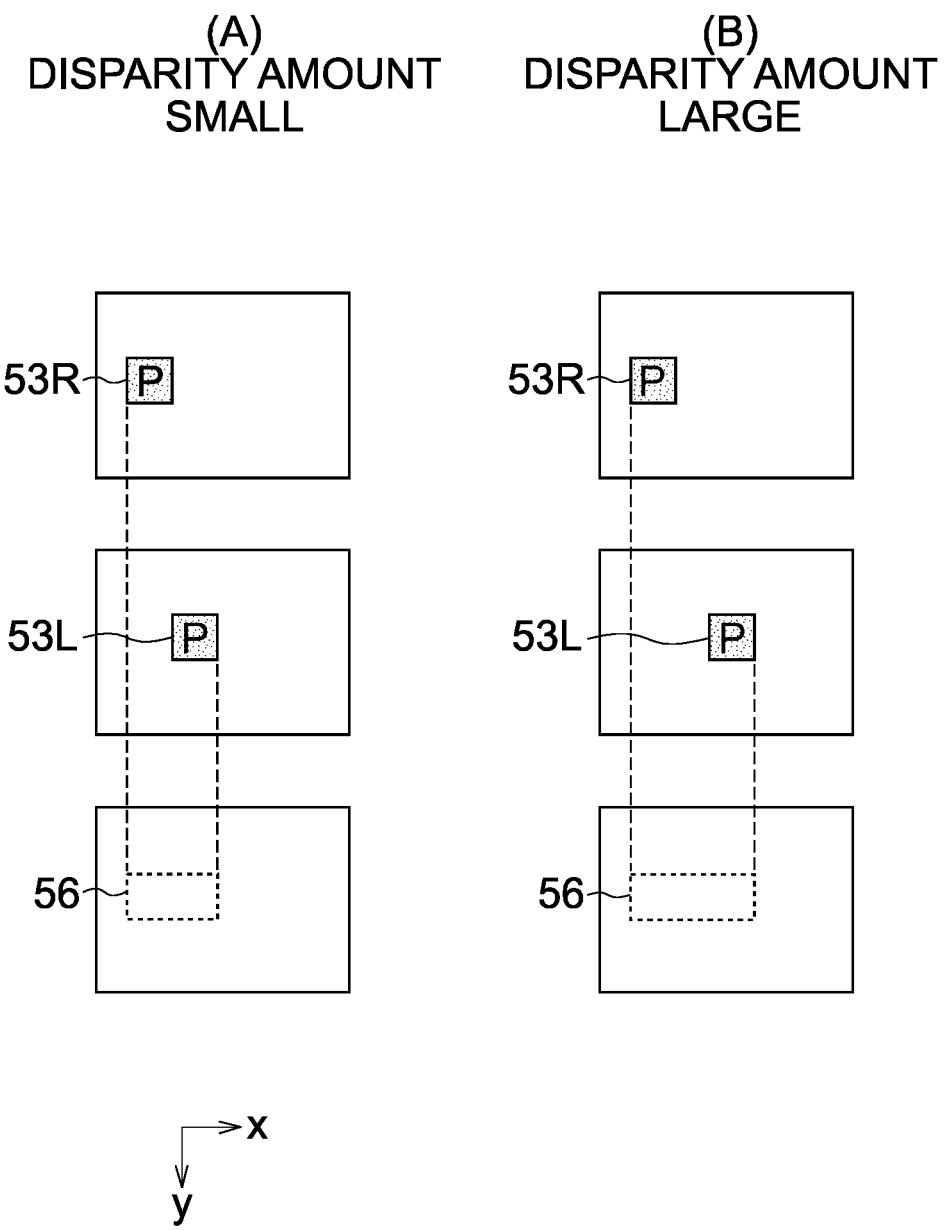
FIG. 11 is an explanatory diagram illustrating an example of an instruction stereoscopic image and instruction position detection area in a case where dominant eye information is not acquired.

In a case where user's dominant eye information is not acquired, an area which can be instructed cannot be covered only by detecting a user's instruction only in the intermediate position between the instruction left-eye image position and the instruction right-eye image position. This is because the user whose right eye is the dominant eye tens to instruct the periphery of the instruction right-eye image and the user whose left eye is the dominant tends to instruct the periphery of the instruction left-eye image. Therefore, in a case where the dominant eye information is not acquired, as illustrated in parts (A) and (B) of FIG. 11, the instruction position detection area decision unit 18 decides the instruction position detection area 56 such that at least part of the instruction right-eye image 53R and at least part of the instruction left-eye image 53L are included. Here, part (A) of FIG. 11 illustrates an example in the case of the minimum disparity amount (i.e., minimum pop-up amount of a stereoscopic image) and part (B) of FIG. 11 illustrates an example in the case of the maximum disparity amount (i.e., maximum pop-up amount of the stereoscopic image).

In a case where the user's dominant eye information is not acquired, there is the first case where the dominant eye information setting unit 20 is omitted from the configuration of FIG. 1, and there is the second case where the user's dominant eye information is not set by the dominant eye information setting unit 20 in the configuration illustrated in FIG. 1.

Figure 12:
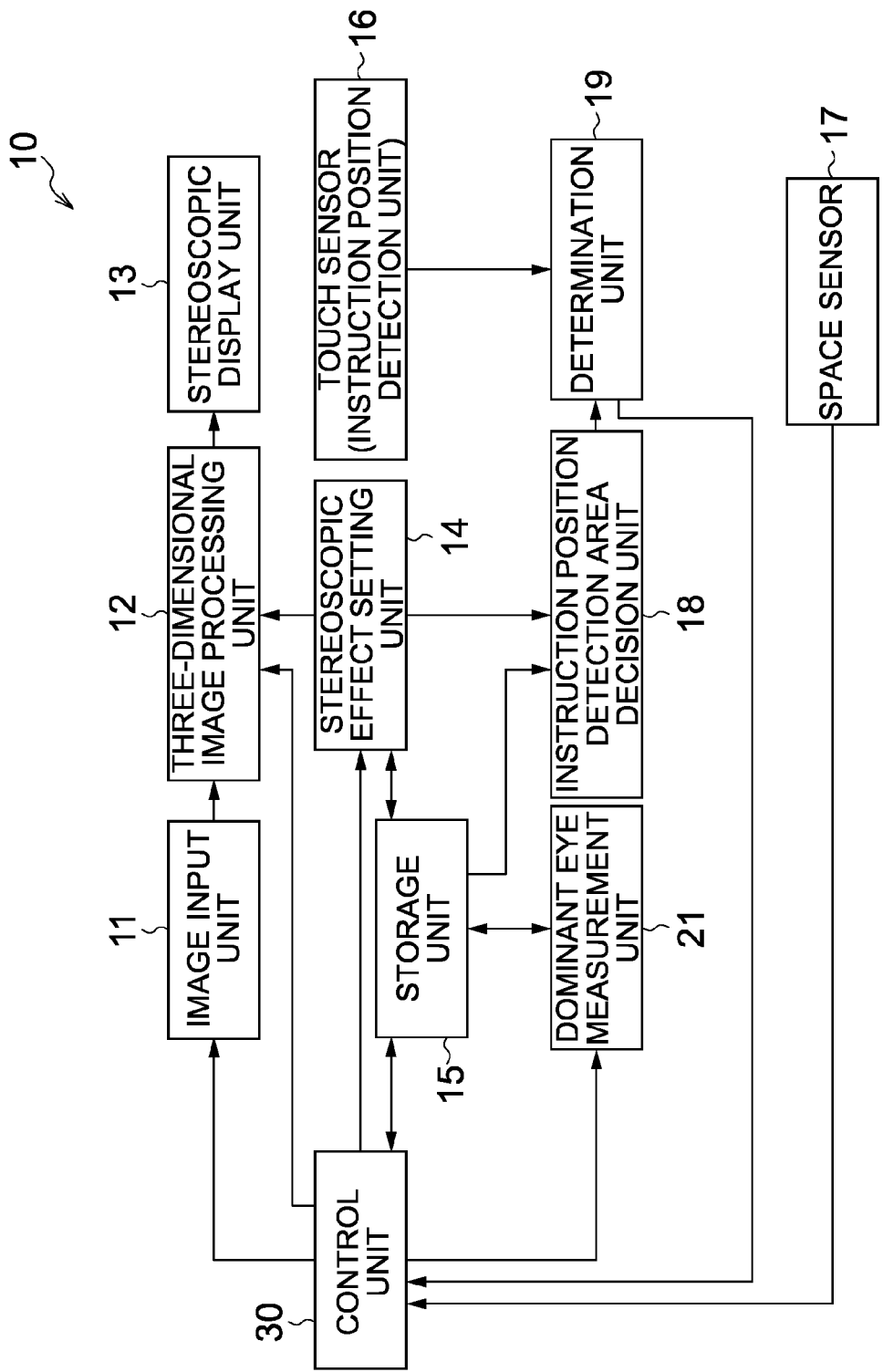
FIG. 12 is a block diagram illustrating the entire configuration of another example of a stereoscopic device according to the present invention.

Next, an explanation is given to a case where the dominant eye information is measured. FIG. 12 is a block diagram illustrating a configuration example of the stereoscopic display device 10 that can measure dominant eye information. Here, the same reference numerals are assigned to the components illustrated in FIG. 1 and the explanation is omitted with respect to the explained matters.

The stereoscopic display device 10 in FIG. 12 includes a dominant eye measurement unit 21 as a dominant eye information acquisition unit, performs dominant eye measurement by the dominant eye measurement unit 21 and stores dominant eye information that is the measurement result in the storage unit 15. The control unit 30 controls each unit including the dominant eye measurement unit 21.

The dominant eye measurement unit 21 calculates a dominant eye parameter on the basis of the disparity amount of an instruction 3D image, which includes the instruction right-eye image 53R and the instruction left-eye image 53L, and the user's instruction position detected by an instruction position detection unit 16 in a state where the instruction 3D image is displayed on the stereoscopic display unit 13.

The dominant eye parameter denotes dominant eye information in this example and indicates the user's dominant eye together with the acuity level of the dominant eye (hereafter referred to as "dominant eye degree"). The dominant eye degree shows how the user's instruction position on the display screen of the stereoscopic display unit 13 is shifted to the display position of the instruction image on the dominant side out of the display position of the instruction right-eye image 53R and the display position of the instruction left-eye image 53L.

Figure 13:
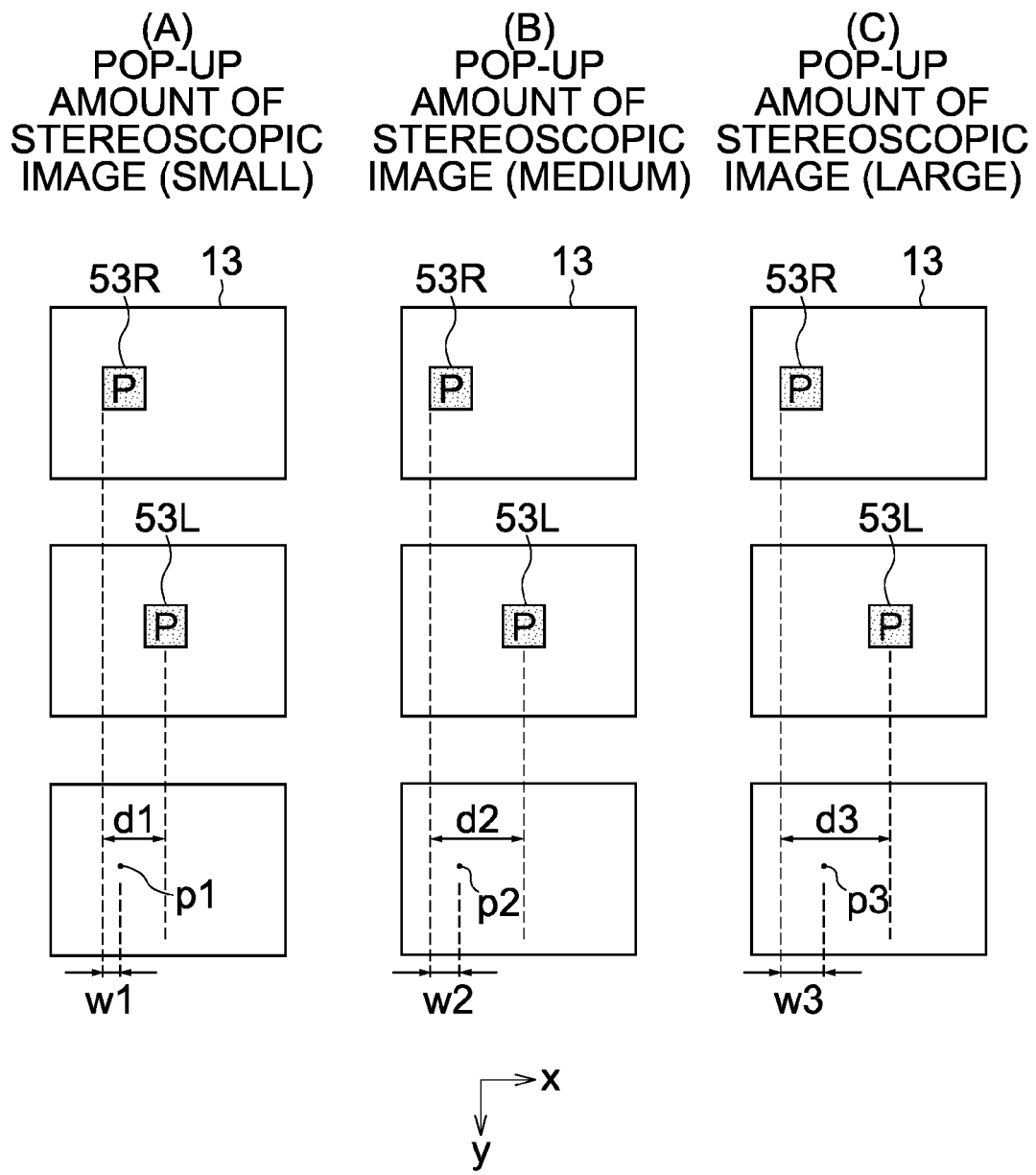
FIG. 13 is an explanatory diagram used to describe an example of dominant eye measurement processing.

For example, as illustrated in parts (A) to (C) of FIG. 13, an instruction 3D image including the instruction right-eye image 53R and the instruction left-eye image 53L is displayed on the stereoscopic display unit 13 by three kinds of stereoscopic effects. In this example, it is displayed while changing the stereoscopic effect (i.e., pop-up amount of the stereoscopic image) between three kinds, that is, the small, the medium and the large. That is, the stereoscopic effect of the instruction 3D image is changed by changing the disparity amount between d1, d2 and d3 by the stereoscopic effect setting unit 14, the user is caused to perform instruction operation with respect to each instruction 3D image and instruction positions p1, p2 and p3 respectively corresponding to disparity amounts d1, d2 and d3 are detected by the instruction position detection unit 16 as coordinate values on the display screen of the stereoscopic display unit 13.

In this example, w=a×d is used as a dominant eye model equation. Here, "w" denotes the distance from the reference position of one instruction image (which is the center position of the instruction right-eye image 53R in this example) to the instruction position, "a" denotes a dominant eye parameter and "d" denotes the disparity amount. That is, by the dominant eye measurement unit 21, the reference position (i.e., center position) of the instruction right-eye image 53R and the reference position (i.e., center position) of the instruction left-eye image 53L corresponding thereto are used as references, and numerical value a=w/d showing to which of the reference positions of the instruction images the instruction position is closer (i.e. shifted) is calculated as a dominant eye parameter.

For example, in a case where the user is dextrocular, dominant eye parameter "a" is less than 0.5. That is, the instruction position becomes a position closer to the center position of the instruction right-eye image 53R. In a case where the user is sinistrocular, dominant eye parameter "a" becomes larger than 0.5. That is, the instruction position becomes a position closer to the center position of the instruction left-eye image 53L. Here, in a case where the dominant eye parameter "a" becomes 0.5, although there is a high possibility that the user is both dextrocular and sinistrocular, it may be processed that the user is dextrocular or sinistrocular for convenience sake.

Here, since dominant eye parameter "a" varies every observer (user), it is preferable that it is stored in the storage unit 15 in association with the user ID (e.g., name) and a range (i.e., position and size) of the instruction position detection area is decided for each user by the instruction position detection area decision unit 18.

To improve the measurement accuracy of the dominant eye measurement by the dominant eye measurement unit 21, the following measurement modes are provided.

First, there is a mode that the instruction 3D image is displayed on the stereoscopic display unit 13 multiple times while varying the disparity amount, the user's instruction position is detected by the instruction position detection unit 16 multiple times and dominant eye information is calculated.

Second, there is a mode that the instruction 3D image is displayed on the stereoscopic display unit 13 multiple times while varying the display position, the user's instruction position is detected by the instruction position detection unit 16 multiple times and dominant eye information is calculated. It is preferable to vary the disparity amount every time the instruction 3D image is displayed once.

Third, there is a mode that multiple items of instruction 3D images are displayed on the stereoscopic display unit 13 at the same time while varying the display position, the user's instruction position is detected by the instruction position detection unit 16 multiple times and dominant eye information is calculated. It is preferable to vary the disparity amount every instruction 3D image.

Since the stereoscopic display device 10 of this example measures the user's dominant eye and the dominant eye degree and decides an instruction position detection area on the basis of the measurement result, it is possible to decide a user's instruction more accurately.

Here, in the first embodiment to the third embodiment, although an example case has been described where both the position and size of an instruction position detection area are decided according to user's dominant eye information, one of the position and the size may be decided according to the user's dominant eye. Moreover, although an example case has been described where the shape of an instruction position detection area is quadrangular, the shape of the instruction position detection area is not especially limited. For example, the elliptic shape is acceptable.

Moreover, the shape of the instruction position detection area may be decided according to the user's dominant eye.

Although a mere quadrangle button image has been illustrated above as an instruction stereoscopic image for ease of understanding of the present invention, the "button image" is not limited to such an image and includes various stereoscopic images that accept press operation by an indicator (such as a finger and a touch pen). For example, a 3D icon image and a 3D thumbnail image are included. Moreover, in the present invention, an "instruction stereoscopic image" is not especially limited to the "button image." Various images are included which accept an instruction by various touch operations such as slide operation, rotation operation, movement operation, expansion operation and reduction operation like a 3D slide bar, for example.

Moreover, although an example case has been described where an instruction stereoscopic image is displayed so as to be pressed as an indicator approaches the display screen, the present invention is also applicable to a case where the instruction stereoscopic image is displayed so as to approach from the deep in the display screen to the display screen as the indicator approaches the display screen.

Moreover, the control unit 30 may detect that the user who inputs an instruction by the touch sensor 16 (i.e., an instruction position detection unit) is changed.

For example, the control unit 30 (i.e., a user change detection unit) calculates the number of times or the frequency that the instruction position (i.e., touch position) detected by the touch sensor 16 is outside a range of the instruction position detection area decided by the instruction position detection area decision unit 18, and detects the user's change on the basis of the calculation result. The control unit 30 may create historical information on the instruction position detected by the touch sensor 16 and detect the user's change on the basis of the historical information on the instruction position. For example, the user's change is detected by detecting the dominant eye or a change of the acuity of the dominant eye on the basis of historical information on the instruction position.

In a case where the user's change is detected, the control unit 30 executes at least one processing of the following calibration processing, detection mode switching processing, display mode switching processing and notice processing.

In the calibration processing, dominant eye information of a new user is acquired to decide the difference in at least one of the position, size and shape of a detection area with respect to the display areas of the instruction left-eye image and instruction right-eye image.

The detection mode switching processing performs switching from the first detection mode, which decides an instruction position detection area according to the user's dominant eye or the acuity of the dominant eye on the basis of dominant eye information, to the second detection mode which sets the instruction position detection area to the default whose size is larger than the above-mentioned first detection mode.

The display mode switching processing performs switching from a stereoscopic display mode that displays an instruction 3D image to a plane display mode that displays an instruction 2D image.

Selection of processing executed in a case where the user's change is detected may be accepted from the user.

Figure 14:
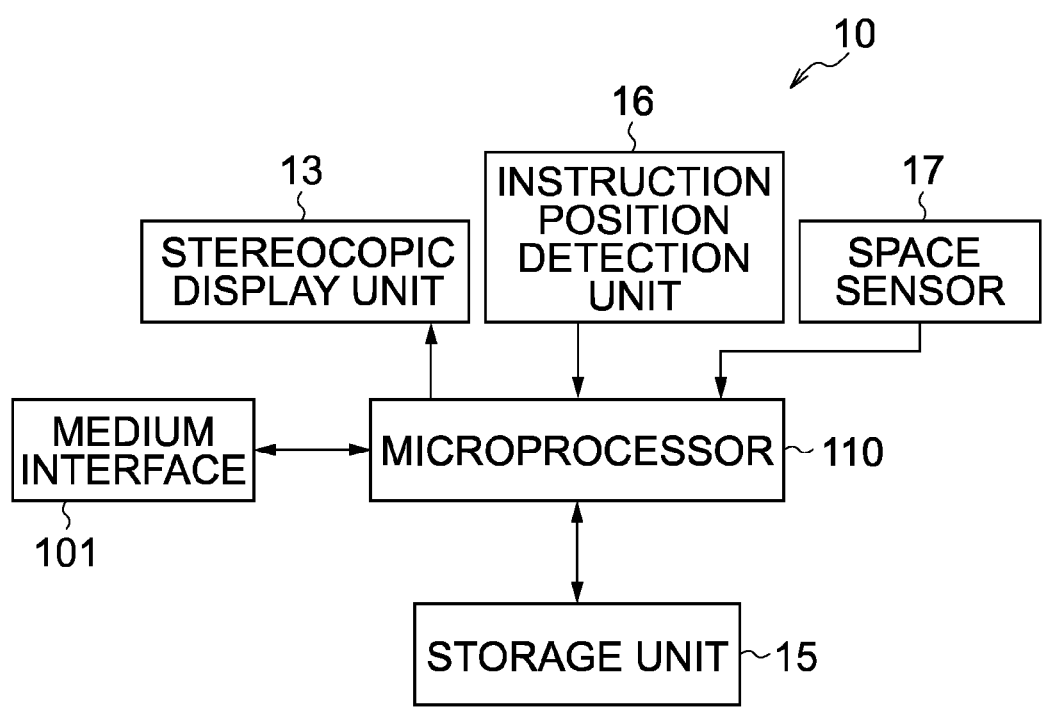
FIG. 14 is a block diagram illustrating a basis hardware configuration example of a stereoscopic display device.

FIG. 14 is a block diagram illustrating a basic hardware configuration that applies a stereoscopic display device according to the above-mentioned first to third embodiments. In the stereoscopic display device 10 in FIG. 14, a microprocessor 110 includes the three-dimensional image processing unit 12 according to the first and second embodiments, an instruction position detection area decision unit 18, a determination unit 19, a control unit 30 and a dominant eye measurement unit 21. Moreover, a medium interface 101 includes the image input unit 11. The medium interface 101 performs data reading and data writing with respect to a medium detachable to the main body of the stereoscopic display device 10 like a memory card. As the medium interface 101, a network interface that performs communication via a network may be used.

As the stereoscopic display device 10 in FIG. 14, for example, there are various digital devices that can perform stereoscopic display, such as a personal computer, a 3D camera device, a 3D portable terminal device, a 3D game device, a 3D guide device and a 3D television device.

In a case where the stereoscopic display device 10 in FIG. 14 is used as a 3D camera device, a 3D imaging unit which acquires a photographed 3D image by photographing the object at multiple viewpoints is provided separately from the space sensor 17, and the photographed stereoscopic image acquired in the stereoscopic imaging unit and the instruction stereoscopic image are combined and stereoscopically displayed by the stereoscopic display unit 13.

Although an example case has been described above where an instruction position on the display screen is detected by the touch sensor 16, the instruction position may be detected by the space sensor 17.

Figure 15:
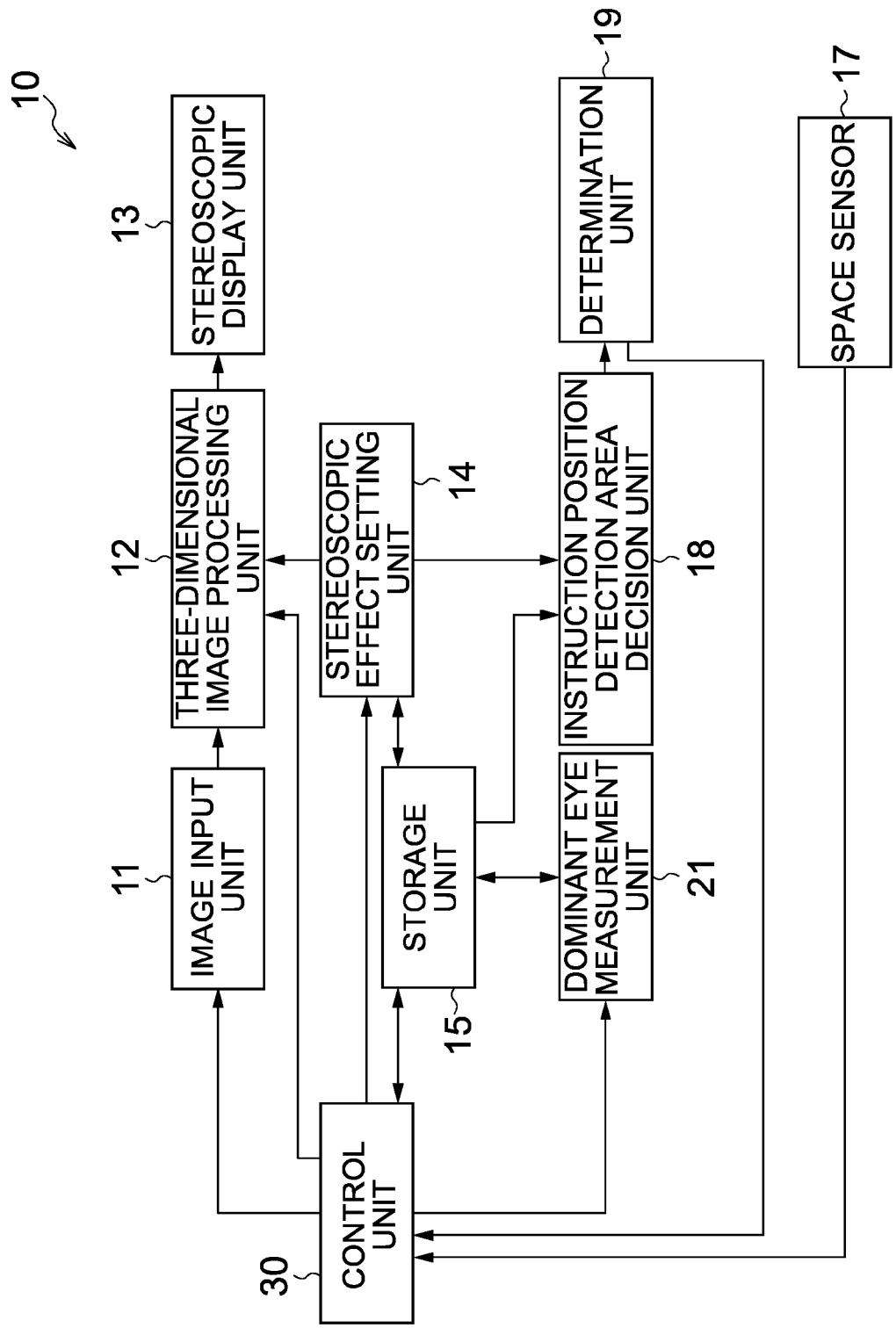
FIG. 15 is a block diagram illustrating the entire configuration of an example of a stereoscopic display device according to the present invention that can detect an instruction position by a space sensor.

FIG. 15 illustrates the entire configuration of one example of the stereoscopic display device 10 in which an instruction position can be detected by the space sensor 17. In FIG. 15, the same reference numerals are assigned to the components illustrated in FIG. 12 and only points different from the case of FIG. 12 is described.

The space sensor 17 detects the instruction position on the display screen of the stereoscopic display unit 13 instructed by the indicator and detects the interval between the display screen of the stereoscopic display unit 13 and the indicator. The determination unit 19 determines whether the instruction position detected by the space sensor 17 is within a detection area corresponding to an instruction 3D image, and accepts an instruction corresponding to the instruction 3D image.

When an indicator's instruction to the display screen is detected by the space sensor 17, the three-dimensional image processing unit 12 switches the instruction 3D image to plane display.

According to the space sensor 17 of this example it is possible to detect whether an indicator such as a finger touches the display screen of the stereoscopic display unit 13 and which position on the display screen the indicator touches. As an example of such the space sensor 17, there is a stereo camera (e.g., a compound-eye 3D camera and a single-eye 3D camera).

Figure 16:
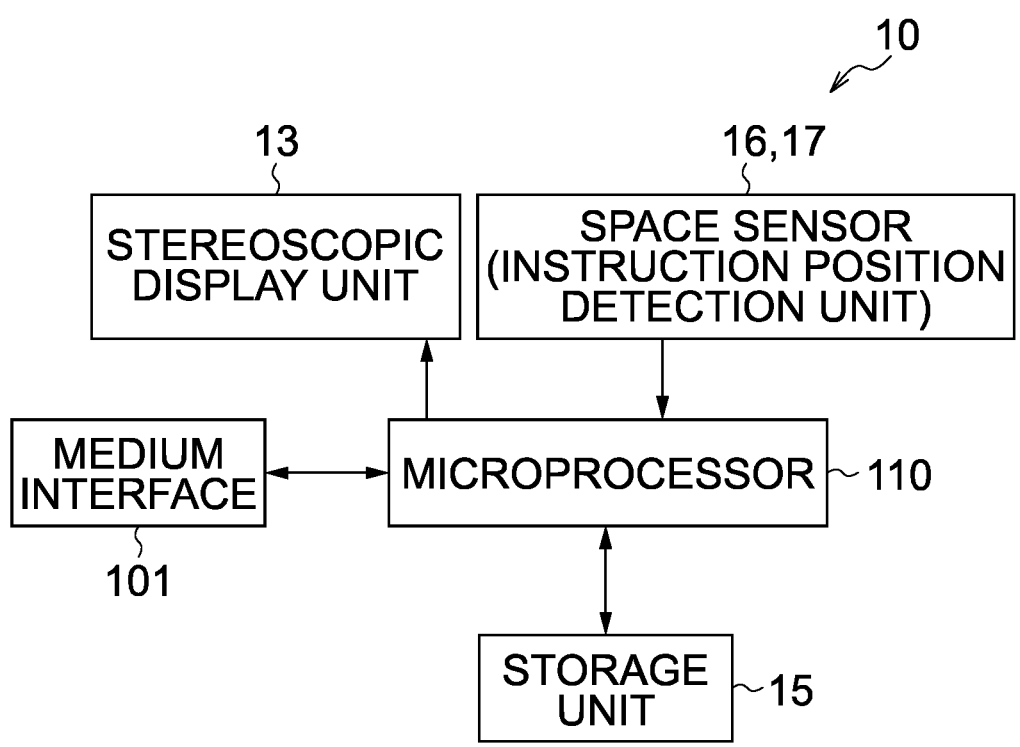
FIG. 16 is a block diagram illustrating a basis hardware configuration example for the stereoscopic display device in FIG. 15.
Figure 17:
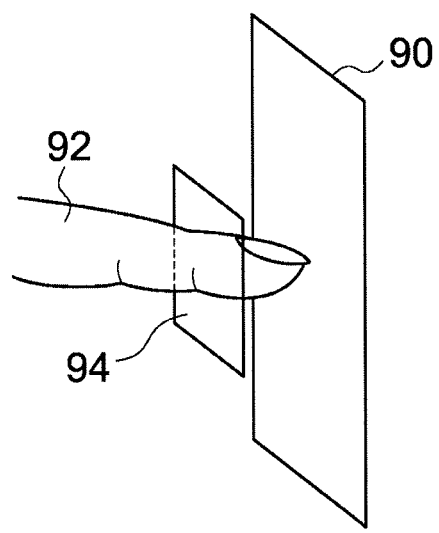
FIG. 17 is an explanatory diagram used to describe a problem of the present invention.

FIG. 16 is a block diagram illustrating a basic hardware configuration example for the stereoscopic display device illustrated in FIG. 15. In FIG. 16, the same reference numerals are assigned to the components illustrated in FIG. 14, and there is a different point from the case of FIG. 14 in that the space sensor 17 is also used as the instruction position detection unit 16.

The invention disclosed above and the inventions applying the invention are as follows.

Invention 1: a stereoscopic display device including: a stereoscopic display unit for displaying an instruction stereoscopic image formed with an instruction left-eye image and an instruction right-eye image to be instructed by an indicator; a space sensor that detects an instruction position which is instructed by the indicator on a display screen of the stereoscopic display unit and detects an interval between the display screen of the stereoscopic display unit and the indicator; a determination unit for determining whether the instruction position detected by the space sensor is within a detection area corresponding to the instruction stereoscopic image, and accepting an instruction corresponding to the instruction stereoscopic image; a disparity amount decision unit for deciding a disparity amount between the instruction left-eye image and the instruction right-eye image displayed by the stereoscopic display unit, and decreasing the disparity amount between the instruction left-eye image and the instruction right-eye image according to a decrease in the interval detected by the space sensor; and an image processing unit for displaying the instruction stereoscopic image on the stereoscopic display unit by the disparity amount decided by the disparity amount decision unit.

Invention 2: a stereoscopic display device including: a stereoscopic display unit for displaying an instruction stereoscopic image formed with an instruction left-eye image and an instruction right-eye image to be instructed by an indicator; a touch sensor that is arranged on a display screen of the stereoscopic display unit and detects an instruction position touched by the indicator; a determination unit for determining whether the instruction position in which the touch is detected by the touch sensor is within a detection area corresponding to the instruction stereoscopic image, and accepting an instruction corresponding to the instruction stereoscopic image; a space sensor that detects an interval between a touch surface of the touch sensor or the display screen of the stereoscopic display unit and the indicator; a disparity amount decision unit for deciding a disparity amount between the instruction left-eye image and the instruction right-eye image displayed by the stereoscopic display unit, and decreasing the disparity amount between the instruction left-eye image and the instruction right-eye image according to a decrease in the interval detected by the space sensor; and an image processing unit for displaying the instruction stereoscopic image on the stereoscopic display unit by the disparity amount decided by the disparity amount decision unit.

Invention 3: the stereoscopic display device according to invention 1, in which the image processing unit switches the instruction stereoscopic image to plane display when an instruction of the indicator to the display screen is detected by the space sensor.

Invention 4: the stereoscopic display device according to invention 2, in which the image processing unit switches the instruction stereoscopic image to plane display when the touch of the indicator to the display screen is detected by the touch sensor.

Invention 5: the stereoscopic display device according to one of inventions 1 to 4, in which: the space sensor detects a three-dimensional position of the indicator on a space; and, in a case where a plurality of instruction stereoscopic images are displayed on the stereoscopic display unit, the image processing unit specifies an instruction stereoscopic image facing the indicator based on the three-dimensional position of the indicator, and, only for the instruction stereoscopic image facing the indicator among the plurality of instruction stereoscopic images, decreases a disparity amount between the instruction right-eye image and the instruction left-eye image according to a decrease in the interval.

Invention 6: the stereoscopic display device according to one of inventions 1 to 5, in which: the space sensor detects a three-dimensional position of the indicator on a space; and, in a case where a plurality of instruction stereoscopic images are displayed on the stereoscopic display unit, the image processing unit specifies an instruction stereoscopic image facing the indicator based on the three-dimensional position of the indicator, and, when an instruction of the indicator to the display screen is detected, switches only the instruction stereoscopic image facing the indicator to plane display among the plurality of instruction stereoscopic images.

Invention 7: the stereoscopic display device according to one of inventions 1 to 6, in which: the space sensor detects a three-dimensional position of the indicator on a space; and, in a case where a plurality of instruction stereoscopic images are displayed on the stereoscopic display unit, the image processing unit specifies an instruction stereoscopic image facing the indicator based on the three-dimensional position of the indicator and enlarges a size of only the instruction stereoscopic image facing the indicator among the plurality of instruction stereoscopic images.

Invention 8: the stereoscopic display device according to one of inventions 1 to 7, in which: the space sensor detects a three-dimensional position of the indicator on a space; and, in a case where a plurality of instruction stereoscopic images are displayed on the stereoscopic display unit, the image processing unit specifies an instruction stereoscopic image facing the indicator based on the three-dimensional position of the indicator and moves surrounding instruction stereoscopic images away from the instruction stereoscopic image facing the indicator.

Invention 9: the stereoscopic display device according to one of inventions 1 to 8, in which the disparity amount decision unit increases a disparity amount between the instruction right-eye image and the instruction left-eye image according to an increase in the interval detected by the space sensor.

Invention 10: the stereoscopic display device according to invention 9, in which: the space sensor detects a three-dimensional position of the indicator on a space; and, in a case where a plurality of instruction stereoscopic images are displayed on the stereoscopic display unit, the image processing unit specifies an instruction stereoscopic image facing the indicator based on the three-dimensional position of the indicator, and, only for the instruction stereoscopic image facing the indicator among the plurality of instruction stereoscopic images, increases a disparity amount between the instruction right-eye image and the instruction left-eye image according to an increase in the interval.

Invention 11: the stereoscopic display device according to one of inventions 1 to 10, further including a storage unit for storing dominant eye information indicating a dominant eye of a user, in which, when the disparity amount is decreased according to a decrease in the interval, based on the dominant eye information stored in the storage unit, the image processing unit moves a display position of an instruction image for an eye that is not the dominant eye out of the instruction right-eye image and the instruction left-eye image to a display position of an instruction image for the dominant eye.

Invention 12: the stereoscopic display device according to one of inventions 1 to 10, further including a storage unit for storing dominant eye information indicating a dominant eye of a user and an acuity of the dominant eye, in which, when the disparity amount is decreased according to a decrease in the interval, based on the dominant eye information stored in the storage unit, the image processing unit moves both a display position of the instruction right-eye image and a display position of the instruction left-eye image closer to a position which is closer to a display position of an instruction image for the dominant eye than an intermediate position between the instruction right-eye image and the instruction left-eye image and which is closer to the display position of the instruction image for the dominant eye to an extent depending on acuity of the dominant eye.

Invention 13: the stereoscopic display device according to any one of inventions 11 and 12, further including a detection areas decision unit for deciding a detection area of the instruction position on the display screen of the stereoscopic display unit on the basis of at least the dominant eye information.

Invention 14: the stereoscopic display device according to any one of inventions 1 to 13, further including a dominant eye information acquisition unit for acquiring the dominant eye information by calculating the dominant eye information on the basis of a disparity amount of the instruction stereoscopic image and an instruction position detected in a state where the instruction stereoscopic image is displayed on the stereoscopic display unit.

Invention 15: the stereoscopic display device according to any one of inventions 1 to 13, further including a dominant eye information acquisition unit for acquiring the dominant eye information by accepting an input operation of the dominant eye information.

Invention 16: the stereoscopic display device according to any one of inventions 1 to 15, in which the space sensor is one of a stereoscopic imaging sensor, an infrared light sensor and a capacitance sensor.

Invention 17: the stereoscopic display device according to any one of inventions 1 to 16, in which the indicator is one of a finger and a pen.

Inventions 18-34: instruction acceptance methods corresponding to inventions 1 to 17 respectively.

Invention 35: a stereoscopic display device including: a stereoscopic display unit for displaying an instruction stereoscopic image formed with an instruction right-eye image and an instruction left-eye image to accept an instruction of a user; an instruction position detection unit for detecting an instruction position of the user on a display screen of the stereoscopic display unit; a dominant eye information acquisition unit for acquiring dominant eye information indicating a dominant eye of the user; a detection area decision unit for deciding a detection area of the instruction position on the display screen of the stereoscopic display unit based on at least the dominant eye information; and a determination unit for accepting the instruction of the user corresponding to the instruction stereoscopic image by determining whether the instruction position detected by the instruction position detection unit is within the detection area.

Invention 36: the stereoscopic display device according to invention 35, in which the detection area decision unit switches at least one of a position, size and shape of the detection area depending on whether the dominant eye information exists.

Invention 37: the stereoscopic display device according to invention 36, in which the detection area decision unit sets the size of the detection area to be smaller in a case where the dominant eye information exists than in a case where the dominant eye information does not exist.

Invention 38: the stereoscopic display device according to one of inventions 35 to 37, in which the detection area decision unit switches at least one of the position, the size and the shape of the detection area depending on whether the dominant eye of the user is a right eye or the dominant eye of the user is a left eye in a case where the dominant eye information exists.

Invention 39: the stereoscopic display device according to invention 38, in which the detection area decision unit arranges the detection area to be closer to a display position of an instruction image of the dominant eye out of the instruction right-eye image and the instruction left-eye image in a case where the dominant eye information exists.

Invention 40: the stereoscopic display device according to one of inventions 35 to 39, in which the detection area decision unit decides the detection area such that at least part of the instruction image corresponding to the dominant eye out of the instruction right-eye image and the instruction left-eye image in a case where the dominant eye information exists.

Invention 41: the stereoscopic display device according to one of inventions 35 to 40, in which the detection area decision unit decides the detection area such that at least part of the instruction right-eye image and at least part of the instruction left-eye image are included in a case where the dominant eye information does not exist.

Invention 42: the stereoscopic display device according to one of inventions 35 to 41, in which the dominant eye information acquisition unit calculates the dominant eye information indicating the dominant eye of the user and an acuity of the dominant eye based on a disparity amount of the instruction stereoscopic image and the instruction position of the user detected by the instruction position detection unit in a state where the instruction stereoscopic image is displayed on the stereoscopic display unit.

Invention 43: the stereoscopic display device according to invention 42, in which the instruction stereoscopic image is displayed on the stereoscopic display unit multiple times while the disparity amount is varied, the instruction position of the user is detected multiple times by the instruction position detection unit and the dominant eye information is calculated.

Invention 44: the stereoscopic display device according to one of inventions 42 and 43, in which the instruction stereoscopic image is displayed on the stereoscopic display unit multiple times while the display position is varied, the instruction position of the user is detected multiple times by the instruction position detection unit and the dominant eye information is calculated.

Invention 45: the stereoscopic display device according to one of inventions 42 and 43, in which multiple items of the instruction stereoscopic images are displayed on the stereoscopic display unit while the display position is varied, the instruction position of the user is detected multiple times by the instruction position detection unit and the dominant eye information is calculated.

Invention 46: the stereoscopic display device according to one of inventions 35 to 41, in which the dominant eye information acquisition unit accepts an input operation of the dominant eye information of the user.

Invention 47: the stereoscopic display device according to any one of inventions 35 to 46, further including: a stereoscopic effect setting unit for accepting a setting input operation of magnitude of a stereoscopic effect of the instruction stereoscopic image; and an instruction stereoscopic image generation unit for generating the instruction stereoscopic image by a disparity amount corresponding to the set and input magnitude of the stereoscopic effect, in which: the stereoscopic display unit displays a stereoscopic display image generated by the instruction stereoscopic image generation unit; and the detection area decision unit decides the detection area based also on a disparity amount corresponding to the magnitude of the stereoscopic effect.

Invention 48: the stereoscopic display device according to one of inventions 35 to 47, further including a user change detection unit for detecting a change of a user who inputs an instruction by the instruction position sensing unit.

Invention 49: the stereoscopic display device according to invention 48, in which the user change detection unit calculates the number of times or frequency that the instruction position detected by the instruction position detection unit is outside a range of the detection area decided by the detection area decision unit, and detects the change of the user based on the calculation result.

Invention 50: the stereoscopic display device according to invention 48, in which the user change detection unit creates historical information on the instruction position detected by the instruction position detection unit and detects the change of the user based on the historical information on the instruction position.

Invention 51: the stereoscopic display device according to invention 50, in which the user change detection unit detects the change of the user by detecting the dominant eye or a change of an acuity of the dominant eye based on the history information on the instruction position in one embodiment.

Invention 52: the stereoscopic display device according to one of inventions 48 to 51, further including a control unit for executing at least one of: calibration processing that acquires the dominant eye information on a new user and decides a difference in at least one of a position, size and shape of the detection area with respect to display areas of the instruction left-eye image and the instruction right-eye image; detection mode switching processing that performs switching from a first detection mode that decides the detection area based on the dominant eye information according to the dominant eye of the user or the acuity of the dominant eye to a second detection mode that sets the detection area to a default with a larger size than the first detection mode; display mode switching processing that performs switching from a stereoscopic display mode that displays the instruction stereoscopic image to a plane display mode that displays a plane instruction image; and notice processing that outputs a notice.

Invention 53: the stereoscopic display device according to inventions 48 to 51, further including a selection reception unit for accepting, from the user, a selection of processing executed in a case where the change of the user is detected.

Invention 54: a stereoscopic imaging device including: a stereoscopic display device according to one of inventions 45 to 52; and a stereoscopic imaging picture unit for acquiring a photographed stereoscopic image by photographing an object from multiple viewpoints, in which the stereoscopic display unit combines the photographed stereoscopic image and the instruction stereoscopic image and performs stereoscopic display.

Inventions 54 to 72: instruction acceptance methods corresponding to inventions 35 to 53 respectively.

Invention 73: a program that causes a computer to execute an instruction acceptance method according to one of inventions 18 to 34 and 54 to 72.

Invention 74: a recording medium that records the program described in invention 73. That is, it is possible to record the program in a predetermined recording medium and provide and use it.

Although various modes of various present inventions have been described, it is needless to say that the matters described in this specification may be combined as much as possible and implemented.

The present invention is not limited to the examples described in this specification and the examples illustrated in the drawings, and it is natural that various design changes and improvements can be performed without departing from the scope of the present invention.

What is claimed is:

1. A stereoscopic display device comprising:
    a stereoscopic display unit for displaying an instruction stereoscopic image formed with an instruction left-eye image and an instruction right-eye image to be instructed by an indicator;
    a space sensor that detects an instruction position (px, py, pz) orthogonal to a display screen, which is instructed by the indicator on the display screen of the stereoscopic display unit and detects an interval between the display screen of the stereoscopic display unit and the indicator, wherein pz is a distance between the indicator and the display screen;
    a determination unit for determining whether the instruction position detected by the space sensor is within a detection area corresponding to the instruction stereoscopic image, and accepting an instruction corresponding to the instruction stereoscopic image;
    a disparity amount decision unit for deciding a pop-up amount between the instruction left-eye image and the instruction right-eye image displayed by the stereoscopic display unit, and decreasing gradually the pop-up amount between the instruction left-eye image and the instruction right-eye image according to a decrease in the interval pz detected by the space sensor when the interval pz is less than an initial pop-up amount dz0; and
    an image processing unit for displaying the instruction stereoscopic image on the stereoscopic display unit by the pop-up amount decided by the disparity amount decision unit.

2. The stereoscopic display device according to claim 1, wherein the image processing unit switches the instruction stereoscopic image to plane display when an instruction of the indicator to the display screen is detected by the space sensor.

3. The stereoscopic display device according to claim 1, wherein:
    the space sensor detects a three-dimensional position of the indicator on a space; and
    in a case where a plurality of instruction stereoscopic images are displayed on the stereoscopic display unit, the image processing unit specifies an instruction stereoscopic image facing the indicator based on the three-dimensional position of the indicator, and, only for the instruction stereoscopic image facing the indicator among the plurality of instruction stereoscopic images, decreases the pop-up amount between the instruction right-eye image and the instruction left-eye image according to a decrease in the interval.

4. The stereoscopic display device according to claim 1, wherein:
    the space sensor detects a three-dimensional position of the indicator on a space; and
    in a case where a plurality of instruction stereoscopic images are displayed on the stereoscopic display unit, the image processing unit specifies an instruction stereoscopic image facing the indicator based on the three-dimensional position of the indicator, and, when an instruction of the indicator to the display screen is detected, switches only the instruction stereoscopic image facing the indicator to plane display among the plurality of instruction stereoscopic images.

5. The stereoscopic display device according to claim 1, wherein:
    the space sensor detects a three-dimensional position of the indicator on a space; and
    in a case where a plurality of instruction stereoscopic images are displayed on the stereoscopic display unit, the image processing unit specifies an instruction stereoscopic image facing the indicator based on the three-dimensional position of the indicator and enlarges a size of only the instruction stereoscopic image facing the indicator among the plurality of instruction stereoscopic images.

6. The stereoscopic display device according to claim 1, wherein:
    the space sensor detects a three-dimensional position of the indicator on a space; and
    in a case where a plurality of instruction stereoscopic images are displayed on the stereoscopic display unit, the image processing unit specifies an instruction stereoscopic image facing the indicator based on the three-dimensional position of the indicator and moves surrounding instruction stereoscopic images away from the instruction stereoscopic image facing the indicator.

7. The stereoscopic display device according to claim 1, wherein the disparity amount decision unit increases the pop-up amount between the instruction right-eye image and the instruction left-eye image according to an increase in the interval detected by the space sensor.

8. The stereoscopic display device according to claim 7, wherein:
    the space sensor detects a three-dimensional position of the indicator on a space; and
    in a case where a plurality of instruction stereoscopic images are displayed on the stereoscopic display unit, the image processing unit specifies an instruction stereoscopic image facing the indicator based on the three-dimensional position of the indicator, and, only for the instruction stereoscopic image corresponding to the indicator among the plurality of instruction stereoscopic images, increases the pop-up amount between the instruction right-eye image and the instruction left-eye image according to an increase in the interval.

9. The stereoscopic display device according to claim 1, further comprising a storage unit for storing dominant eye information indicating a dominant eye of a user, wherein, when the pop-up amount is decreased according to a decrease in the interval, based on the dominant eye information stored in the storage unit, the image processing unit moves a display position of an instruction image for an eye that is not the dominant eye out of the instruction right-eye image and the instruction left-eye image to a display position of an instruction image for the dominant eye.

10. The stereoscopic display device according to claim 9, further comprising a detection areas decision unit for deciding a detection area of the instruction position on the display screen of the stereoscopic display unit, based on at least the dominant eye information.

11. The stereoscopic display device according to claim 1, further comprising a storage unit for storing dominant eye information indicating a dominant eye of a user and an acuity of the dominant eye, wherein, when the pop-up amount is decreased according to a decrease in the interval, based on the dominant eye information stored in the storage unit, the image processing unit moves both a display position of the instruction right-eye image and a display position of the instruction left-eye image closer to a position which is closer to a display position of an instruction image for the dominant eye than an intermediate position between the instruction right-eye image and the instruction left-eye image and which is closer to the display position of the instruction image for the dominant eye to an extent depending on acuity of the dominant eye.

12. The stereoscopic display device according to claim 1, further comprising a dominant eye information acquisition unit for acquiring the dominant eye information by calculating the dominant eye information based on a pop-up amount of the instruction stereoscopic image and an instruction position detected in a state where the instruction stereoscopic image is displayed on the stereoscopic display unit.

13. The stereoscopic display device according to claim 1, further comprising a dominant eye information acquisition unit for acquiring the dominant eye information by accepting an input operation of the dominant eye information.

14. The stereoscopic display device according to claim 1, wherein the space sensor is one of a stereoscopic imaging sensor, an infrared light sensor and a capacitance sensor.

15. The stereoscopic display device according to claim 1, wherein the indicator is one of a finger and a pen.

16. An instruction acceptance method in a stereoscopic display device including a stereoscopic display unit for displaying an instruction stereoscopic image formed with an instruction left-eye image and an instruction right-eye image to be instructed by an indicator and a space sensor that detects an instruction position (px, py, pz) orthogonal to a display screen, where pz is a distance between the indicator and the display screen, and the instruction position is instructed by the indicator on the display screen of the stereoscopic display unit, and detects an interval between the display screen of the stereoscopic display unit and the indicator, the device executing:

displaying the instruction stereoscopic image on the stereoscopic display unit by a predetermined pop-up amount;

acquiring an interval between a display screen of the stereoscopic display unit and the indicator by the space sensor;

decreasing gradually a pop-up amount between the instruction left-eye image and the instruction right-eye image according to a decrease in the acquired interval pz detected by the space sensor when the interval pz is less than an initial pop-up amount dz0; and accepting an instruction corresponding to the instruction stereoscopic image by deciding whether the instruction position detected by the space sensor is within a detection area corresponding to the instruction stereoscopic image.

17. A non-transitory computer-readable medium that records a program that causes the stereoscopic display device to execute an instruction acceptance method according to claim 16.

* * * * *